(12) United States Patent
Rao et al.

(10) Patent No.: US 9,792,629 B2
(45) Date of Patent: Oct. 17, 2017

(54) KEYWORD RECOMMENDATION

(71) Applicant: Yahoo Holdings, Inc., Sunnyvale, CA (US)

(72) Inventors: Supreeth Rao, Sunnyvale, CA (US); Jianning Dong, Mountain View, CA (US); Anurag Ojha, Santa Clara, CA (US); Matt Earls, Santa Barbara, CA (US); Saurabh Dixit, Sunnyvale, CA (US)

(73) Assignee: Yahoo Holdings, Inc., Sunnyvale, CA (US)

( * ) Notice: Subject to any disclaimer, the term of this patent is extended or adjusted under 35 U.S.C. 154(b) by 906 days.

(21) Appl. No.: 14/043,807

(22) Filed: Oct. 1, 2013

(65) Prior Publication Data

US 2015/0039432 A1    Feb. 5, 2015

Related U.S. Application Data

(60) Provisional application No. 61/862,476, filed on Aug. 5, 2013.

(51) Int. Cl.
*G06Q 30/00* (2012.01)
*G06Q 30/02* (2012.01)

(52) U.S. Cl.
CPC ..... *G06Q 30/0273* (2013.01); *G06Q 30/0247* (2013.01); *G06Q 30/0255* (2013.01); *G06Q 30/0256* (2013.01)

(58) Field of Classification Search
CPC ........... G06Q 30/0273; G06Q 30/0247; G06Q 30/0255; G06Q 30/0256
See application file for complete search history.

(56) References Cited

U.S. PATENT DOCUMENTS 5,809,250 A    9/1998 Kisor
7,788,159 B1   8/2010 Sack
(Continued)

FOREIGN PATENT DOCUMENTS

JP    2010277415 A  * 12/2010  ............ G06F 17/30
JP    2012-234545 A    11/2012

OTHER PUBLICATIONS

David, Michael. Search Engine Optimization in 2013 (May 1, 2013). Retrieved online Jun. 8, 2017. http://www.internetrix.com.au/assets/Research-Papers/SEO-FINAL-White-Paper-web.pdf.*
(Continued)

*Primary Examiner* — James A Reagan
(74) *Attorney, Agent, or Firm* — Brinks Gilson & Lione

(57) ABSTRACT

An example system can include a server that includes or is associated with a keyword recommendation module. The keyword recommendation module can be configured to select keywords for a search engine for use in a search engine marketing campaign, wherein the search engine provides more traffic to Internet content of a publisher than other search engines, for the keywords. The module can also be configured to determine, per keyword, user engagement with the Internet content resulting from the traffic provided by the search engine for the keywords, according to one or more of time spent viewing the Internet content, page views of the Internet content, and dwell times. The module can also be configured to score, per keyword, the keywords according to the determined user engagement with the Internet content, and generate keyword recommendations according to the scoring of the keywords.

20 Claims, 9 Drawing Sheets

(56) References Cited

U.S. PATENT DOCUMENTS

| | | |
|---|---|---|
| 8,396,742 B1 | 3/2013 | Blume et al. |
| 8,494,897 B1 | 7/2013 | Dawson |
| 2005/0033771 A1 | 2/2005 | Schmitter et al. |
| 2006/0123001 A1* | 6/2006 | Burns ............... G06F 17/30867 |
| 2006/0248010 A1 | 11/2006 | Krishnamoorthy et al. |
| 2008/0249855 A1 | 10/2008 | Collins et al. |
| 2008/0270470 A1* | 10/2008 | Buck ................... G06F 17/2229 |
| 2009/0292677 A1* | 11/2009 | Kim .................... G06F 17/3089 |
| 2011/0055229 A1 | 3/2011 | Kumar |
| 2011/0302025 A1 | 12/2011 | Hsiao et al. |
| 2012/0158490 A1* | 6/2012 | Neumeyer ......... G06Q 30/0247 |
| | | 705/14.46 |
| 2013/0132364 A1 | 5/2013 | Udupa et al. |
| 2013/0132854 A1 | 5/2013 | Raleigh et al. |
| 2014/0129288 A1 | 5/2014 | Eager et al. |

OTHER PUBLICATIONS

International Preliminary Report on Patentability corresponding to International Application No. PCT/US2014/049380 dated Feb. 9, 2016, 6 pages.
International Search Report and Written Opinion from corresponding International Application No. PCT/US2014/049380, 12pp.
Lipper, Arthur. Royalties, The better way of both investing in and financing of companies and projects. Retrieved online May 26, 2017. file:///C:/Users/jreagan/Documents/e-Red%20Folder/14043800/N PL%20Presentation05212012.pdf.

* cited by examiner

KEYWORD RECOMMENDATION

This application claims the benefit of priority from Provisional Patent Application No. 61/862,476, filed Aug. 5, 2013, which is incorporated by reference.

BACKGROUND

This application relates generally to keyword recommendations. More particularly, this application relates to systems and methods for recommending keywords for search engine marketing (SEM).

Search engine marketing (SEM) has become a significant part of Internet marketing. SEM involves the promotion of websites by increasing their visibility in search engine results pages. SEM uses various strategies to increase ranking of publishers' properties in search engine results and clicks on links in the results to the properties.

BRIEF DESCRIPTION OF THE DRAWINGS

The system may be better understood with reference to the following drawings and description. Non-limiting and non-exhaustive examples are described with reference to the following drawings. The components in the drawings are not necessarily to scale, emphasis instead being placed upon illustrating the principles of the system. In the drawings, like referenced numerals designate corresponding parts throughout the different views.

DETAILED DESCRIPTION

Figure 1:
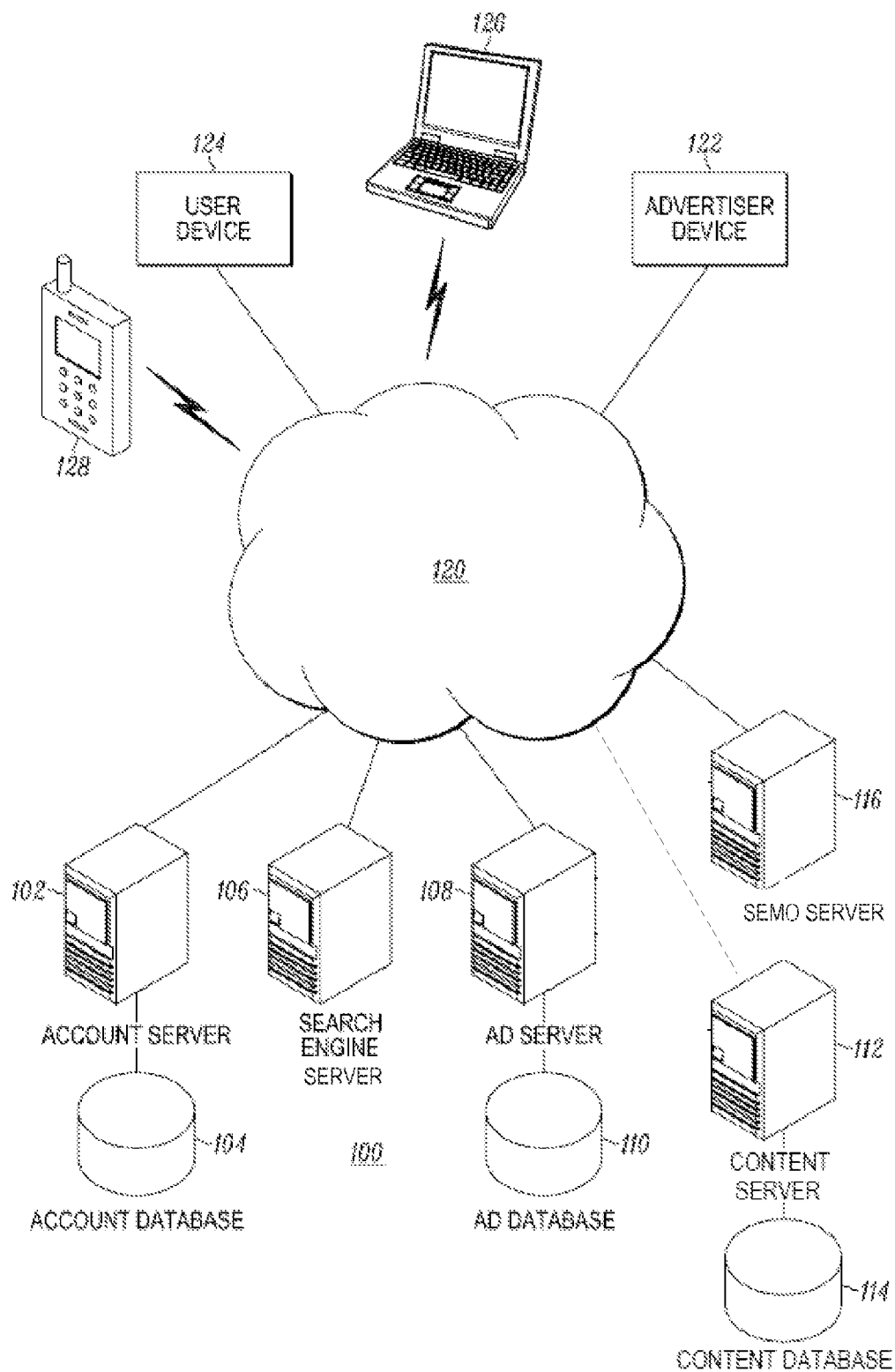
FIG. 1 illustrates a block diagram of an example information system that includes an example SEM optimizer (SEMO).

Subject matter will now be described more fully hereinafter with reference to the accompanying drawings, which form a part hereof, and which show, by way of illustration, specific examples. Subject matter may, however, be embodied in a variety of different forms and, therefore, covered or claimed subject matter is intended to be construed as not being limited to any examples set forth herein; examples are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Throughout the specification and claims, terms may have nuanced meanings suggested or implied in context beyond an explicitly stated meaning. Likewise, the phrase "in an example" as used herein does not necessarily refer to the same example and the phrase "in another example" as used herein does not necessarily refer to a different example. It is intended, for example, that claimed subject matter includes combinations of examples in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

It is intended that the foregoing detailed description be regarded as illustrative rather than limiting, and that it be understood that it is the following claims, including all equivalents, that are intended to define the spirit and scope of this disclosure. Furthermore, the separating of example embodiments in operation blocks or modules described herein or illustrated in the drawings is not to be construed as limiting these blocks or modules as physically separate devices. Operational blocks or modules illustrated or described may be implemented as separate or combined devices, circuits, chips, or computer readable instructions.

Furthermore, each module or feed described herein includes either computer hardware, or a combination of computer hardware and software. For example, each module or feed may include a non-transitory computer readable medium including executable instructions, such as any type of programmable circuit. A programmable circuit may include an application specific integrated circuit (ASIC), a Field Programmable Gate Array (FPGA), a digital logic circuit, an analog circuit, a combination of discrete circuits, gates, and/or any other type of programmable hardware. Additionally, each module can include memory hardware to store the executable instructions; the instructions being executable by a processor, such as a central processing unit (CPU). Any one of the modules may or may not include the processor. Additionally, each module described herein may transmit or receive data by at least one respective communications interface included in that module. The data may be transmitted and received via a network, such as or including the Internet. Also, the term "module" may include a plurality of modules.

Overview of Keyword Recommendation

An example system can include a server that includes or is associated with a keyword recommendation module. The keyword recommendation module can be configured to select keywords for a search engine for use in a search engine marketing campaign, wherein the search engine provides more traffic to Internet content of a publisher than other search engines, for the keywords. The module can also be configured to determine, per keyword, user engagement with the Internet content resulting from the traffic provided by the search engine for the keywords, according to one or more of time spent viewing the Internet content, page views of the Internet content, and dwell times. The module can also be configured to score, per keyword, the keywords according to the determined user engagement with the Internet content, and generate keyword recommendations according to the scoring of the keywords.

Another example can include a processor configured to identify a search query of a plurality of search queries. The search query resulting in an amount of Internet traffic to a website, and occurring at a search engine of a plurality of search engines. The processor may also be configured to identify the search engine, and determine a traffic score corresponding to the amount of Internet traffic to the website and a market share of the search engine relative to other search engines of the plurality of search engines. The processor may also be configured to determine whether the traffic score exceeds expectations, and select for recommendation the search query, as a result of the traffic score exceeding expectations.

Another example can include a non-transitory medium including instructions executable to by a processor to select keywords for a search engine for use in a search engine marketing campaign, wherein the search engine provides more revenue via traffic to Internet content of a publisher than other search engines, for the keywords. The instruction may also be executable to determine, per keyword, revenue generated from the Internet content according to session data associated with traffic and pricing associated with the session data. Also, the instructions may be executable to score, per keyword, the keywords according to the determined revenue generated from the Internet content, and generate keyword recommendations according to the scoring of the keywords.

SEM Optimizer (SEMO)

In accordance with the systems, products, and methods disclosed herein, a system, such as a SEM Optimizer (SEMO), can acquire traffic from search engine marketing at an optimal price, such as a price that increases revenue greater than other prices. The SEMO can employ various arbitrage techniques, including the techniques described herein. Also, other types of marketing optimizers may use the technologies and techniques described herein. For example, the methods and technologies described herein are not limited to search engine marketing, but can be used by marketing systems associated with any source of online content referrals.

In one example, the SEMO may include a data-driven tool for keyword recommendations, which can determine keywords that increase traffic across determined online properties, such as determined webpages. Conventionally, determinations of keywords for SEM campaigns are driven by intuition, not by machine analysis of data and feedback from revenue streams. The SEMO may also include a data-driven tool for price recommendation that can optimally price keywords in SEM campaigns per search engine. The SEMO may also include a data-driven tool that can further optimize SEM campaigns based on revenue generated from a campaign and engagement with aspects of the campaign. The SEMO may also include or be associated with a revenue analysis module, such as a pricing feed, and/or a revenue share analysis module. The SEMO may include an engine made up of one or more computer hardware and/or software modules to provide the functions described herein.

The functions described herein can apply to any type of content, such as online property including sessions of webpage views and content consumed while viewing a stream, such as a mobile content stream. In other words, these functions may apply to content streams viewed on mobile devices. For example, for an incoming view (or dwell time) of a mobile page or stream referred to by a mobile search engine, the SEMO may associate total revenue derived from that view or a session associated with the view. For the purposes of this disclosure, dwell time is the time between two interactions with content, such as content on a webpage.

Also, disclosed herein is an online information system that can provide search results and/or online content and include advertisements with or within the search results and/or content made available to end users. Such search results and content can be made available through webpages, mobile applications ("apps"), TV apps, or other audio or visual content services. Online content and search results can be combined or search results can also be displayed on their own in a search results page. There are many options for displaying such items. For example, advertisements and/or search results can be provided on a same webpage as publisher's content. Publisher's content (or online content besides search results and advertisements) may include any combination of text, graphics, audio, video, or links to other content.

Advertisements are conventionally selected based on a variety of criteria including those specified by the advertiser. The search results are conventionally selected based on various criteria including rules of a respective search engine. An advertiser or agent of the advertiser can define an advertising campaign and/or SEM campaign to control how and when advertisements and/or search results are made available to users. However, usually search results are less controllable, since part of the control is by the search engine provider. Also, the control of the search engine provider may not be transparent, which creates additional complexity when attempting to manage a campaign, such as an SEM campaign.

An online information system can warehouse search query information in audience logs which may be used by the SEMO, and the use of the information may be utilized to drive search result, advertisement, and content display revenue. For example, the SEMO may use processes that used search engine market share basis points to generate keyword recommendations. Further, keyword level revenue measurements may provide for SEM campaigns to focus on bringing in more display revenue, such as search result, advertisement, and content display revenue (e.g., news, sports, finance, and screen revenue).

The SEMO can be implemented via one or more servers, such as a SEMO server. FIG. 1 illustrates how an example SEMO server 116 may be included in an example online information system.

FIG. 1 illustrates a block diagram of an example information system 100. The information system 100 in the example of FIG. 1 includes an account server 102, and account database 104, a search engine server 106, an advertisement (ad) server 108, an ad database 110, a content database 114, a content server 112 and the SEMO server 116. The SEMO server 116 is in data communication with the ad server 108, the ad database 110, the content server 112 and the content database 114. The SEMO server 116 may manage and monitor traffic from search engine marketing and aggregate SEM data.

The information system 100 may be accessible over a network 120 by one or more advertiser devices such as advertiser device 122 and by one or more user devices such as user device 124. In various examples of such an online information system, users may search for and obtain content from sources over the network 120 or from the content database 114. Advertisers may provide advertisements for placement on webpages and other communications sent over the network to user devices such as the user device 124. The online information system in one example is deployed and operated by an online provider such as Yahoo! Inc.

The account server 102 stores account information for advertisers. The account server 102 is in data communication with the account database 104. Account information may include one or more database records associated with each respective advertiser. Any suitable information may be stored, maintained, updated and read from the account database 104 by the account management server 102. Examples include advertiser identification information, advertiser security information such as passwords and other security credentials, and account balance information.

The account server 102 may be implemented using any suitable device. The account management server 102 may be implemented as a single server, a plurality of servers, or any other type of computing device known in the art. Preferably, access to the account server 102 is accomplished through a firewall, not shown, which protects the account management programs and the account information from external tampering. Additional security may be provided via enhancements to the standard communications protocols such as Secure HTTP or the Secure Sockets Layer.

The account server 102 may provide an advertiser front end to simplify the process of accessing the account information of an advertiser. The advertiser front end may be a program, application or software routine that forms a user interface. In a particular example, the advertiser front end is accessible as a web site with one or more webpages that an accessing advertiser may view on an advertiser device such as advertiser device 122. The advertiser may view and edit account data and advertisement data using the advertiser front end. After editing the advertising data, the account data may then be saved to the account database 104.

The search engine server 106 may be a computer system, one or more servers, or any other computing device known in the art. Alternatively, the search engine server 106 may be a computer program, instructions, or software code stored on a computer-readable storage medium that runs on a processor of a single server, a plurality of servers, or any other type of computing device known in the art. The search engine server 106 may be accessed, for example, by user devices such as the user device 124 operated by a user over the network 120. The user device 124 communicates a user query to the search engine server 106. The search engine server 106 locates matching information using any suitable protocol or algorithm and returns information to the user device 124. The search engine server 106 may be designed to help users find information located on the Internet or an intranet. In a particular example, the search engine server 106 may also provide to the user device 124 over the network 120 a webpage with content including search results, information matching the context of a user inquiry, links to other network destinations or information and files of information of interest to a user operating the user device 124, as well as a stream or webpage of content items and advertisement items selected for display to the user.

The search engine server 106 may enable a device, such as the user device 124 or any other client device, to search for files of interest using a search query. Typically, the search engine server 106 may be accessed by a client device via one or more servers or directly over the network 120. The search engine server 106 may, for example, in an illustrative example, comprise a crawler component, an indexer component, an index storage component, a search component, a ranking component, a cache, a profile storage component, a logon component, a profile builder, and one or more application program interfaces (APIs). The search engine server 106 may be deployed in a distributed manner, such as via a set of distributed servers, for example. Components may be duplicated within a network, such as for redundancy or better access.

The ad server 108 operates to serve advertisements to user devices such as the user device 124. Advertisements include data defining advertisement information that may be of interest to a user of a user device. An advertisement may include text data, graphic data, image data, video data, or audio data. An advertisement may further include data defining one or more links to other network resources providing such data. The other locations may be other locations on the internet, other locations on an intranet operated by the advertiser, or any access.

For online information providers, advertisements may be displayed on webpages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users.

One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior.

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users.

Yet another approach includes targeting based on content of a webpage requested by a user. Advertisements may be placed on a webpage or in association with other content that is related to the subject of the advertisements. The relationship between the content and the advertisement may be determined in any suitable manner. The overall theme of a particular webpage may be ascertained, for example, by analyzing the content presented therein. Moreover, techniques have been developed for displaying advertisements geared to the particular section of the article currently being viewed by the user. Accordingly, an advertisement may be selected by matching keywords/and or phrases within the advertisement and the webpage.

The ad server 108 includes logic and data operative to format the advertisement data for communication to the user device. The ad server 108 is in data communication with the ad database 110. The ad database 110 stores information including data defining advertisements to be served to user devices. This advertisement data may be stored in the ad database 110 by another data processing device or by an advertiser. The advertising data may include data defining advertisement creatives and bid amounts for respective advertisements.

For example, the advertising data may be formatted to an advertising item that may be included in a stream of content items and advertising items provided to a user device. The formatted advertising items are specified by appearance, size, shape, text formatting, graphics formatting and included information, which may all be standardized to provide a consistent look for all advertising items in the stream. At least some advertising items may have an associated bid amount and may be considered revenue generating items. The ad server 108 then provides the advertising items to other network devices such as the SEMO server 116.

Further, the ad server 108 is in data communication with the network 120. The ad server 108 communicates ad data and other information to devices over the network 120. This information may include advertisement data communicated to a user device. This information may also include advertisement data and other information communicated with an advertiser device such as the advertiser device 122. An advertiser operating an advertiser device may access the ad server 108 over the network to access information including advertisement data. This access may include developing advertisement creatives, editing advertisement data, deleting advertisement data, setting and adjusting bid amounts and other activities.

The ad server 108 may provide an advertiser front end to simplify the process of accessing the advertising data of an advertiser. The advertiser front end may be a program, application or software routine that forms a user interface. In one particular example, the advertiser front end is accessible as a web site with one or more webpages that an accessing advertiser may view on the advertiser device. The advertiser may view and edit advertising data using the advertiser front end. After editing the advertising data, the advertising data may then be saved to the ad database 110 for subsequent communication in advertisements to a user device.

The ad server 108 may be a computer system, one or more servers, or any other computing device known in the art. Alternatively, the ad server 108 may be a computer program, instructions and/or software code stored on a computer-readable storage medium that runs on a processor of a single server, a plurality of servers, or any other type of computing device known in the art.

The content server 112 is in data communication with the content database 114, the ad server 108 and the SEMO server 116. The content server 112 may access information about content items either from the content database 114 or from another location accessible over the network 120. The content server 112 communicates data defining content items and other information to devices over the network 120. This information may include content data communicated to a user device. This information may also include content data and other information communicated with a content provider operating a content provider device. A content provider operating a content provider device may access the content server 112 over the network 120 to access information including content data. This access may include developing content items, editing content items, deleting content items, setting and adjusting bid amounts and other activities.

The content server 112 may provide a content provider front end to simplify the process of accessing the content data of a content provider. The content provider front end may be a program, application or software routine that forms a user interface. In a particular example, the content provider front end is accessible as a web site with one or more webpages that an accessing content provider may view on the content provider device. The content provider may view and edit content data using the content provider front end. After editing the content data, the content data may then be saved to the content database 114 for subsequent communication to a user device.

The content server 112 includes logic and data operative to format content data and other information for communication to the user device. For example, the content data may be formatted to a content item that may be included in a stream of content items and advertisement items provided to a user device. The formatted content items are specified by appearance, size, shape, text formatting, graphics formatting and included information, which may all be standardized to provide a consistent look for all content items in the stream. In some examples, the content items have an associate bid amount that may be used for ranking or positioning the content items in a stream of items presented to a user device. In other examples, the content items do not include a bid amount or the bid amount is not used for ranking the content items. Such content items may be considered non-revenue generating items. The content server 112 then provides the content items to other network devices such as the ad server 108 and the SEMO server 116.

The account server 102, the search engine server 106, the ad server 108, the content server 112 and the SEMO server 116 may be implemented as any suitable computing device. A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

The account server 102, the search engine server 106, the ad server 108, the content server 112 and the SEMO server 116 may be implemented as online server systems or may be in communication with online server systems. An online server system may include a device that includes a configuration to provide content via a network to another device including in response to received requests for page views. An online server system may, for example, host a site, such as a social networking site, examples of which may include, without limitation, Flicker, Twitter, Facebook, LinkedIn, or a personal user site (such as a blog, vlog, online dating site, etc.). An online server system may also host a variety of other sites, including, but not limited to business sites, educational sites, dictionary sites, encyclopedia sites, wikis, financial sites, government sites, etc.

An online server system may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as an online server system include desktop computers, multiprocessor systems, microprocessor-type or programmable consumer electronics, etc. The online server system may not be under common ownership or control with the ad server 108, the content server 112 or the SEMO server 116.

The network 120 may include any data communication network or combination of networks. A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network such as the network 120. Various types of devices may, for example, be made available to provide an interoperable capability for differing architectures or protocols. For example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

The advertiser device 122 includes any data processing device that may access the information system 100 over the network 120. The advertiser device 122 is operative to interact over the network 120 with the account server 102, the search engine server 106, the ad server 108, the SEMO server 116, content servers and other data processing systems. The advertiser device 122 may, for example, implement a web browser for viewing webpages and submitting user requests. The advertiser device 122 may communicate data to the information system 100, including data defining webpages and other information. The advertiser device 122 may receive communications from the information system 100, including data defining webpages and advertising creatives.

In some examples, content providers may access the information system 100 with content provider devices that are generally analogous to the advertiser devices in structure and function. The content provider devices provide access to content data in the content database 114, for example.

The user device 124 includes any data processing device that may access the information system 100 over the network 120. The user device 124 is operative to interact over the network 120 with the search engine server 106. The user device 124 may, for example, implement a web browser for viewing webpages and submitting user requests. A user operating the user device 124 may enter a search request and communicate the search request to the information system 100. The search request is processed by the search engine and search results are returned to the user device 124. In other examples, a user of the user device 124 may request data such as a page of information from the online information system 100. The data instead may be provided in another environment such as a native mobile application, TV application, or an audio application. The online information system 100 may provide the data or re-direct the browser to another web site. In addition, the ad server may select advertisements from the ad database 110 and include data defining the advertisements in the provided data to the user device 124.

The advertiser device 122 and the user device 124 operate as a client device when accessing information on the information system 100. A client device such as the advertiser device 122 and the user device 124 may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. In the example of FIG. 1, both laptop computer 126 and smartphone 128 may be operated as either an advertiser device or a user device.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example. A client device such as the advertiser device 122 and the user device 124 may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games. The foregoing is provided to illustrate that claimed subject matter is intended to include a wide range of possible features or capabilities.

Also, the disclosed methods and systems may be implemented partly in a server, a client device, a cloud computing environment, partially in a server and partially in a client device, or a combination of the server, the cloud computing environment and the client device.

Content/Advertisements of a Content/Advertising Network

Figure 2:
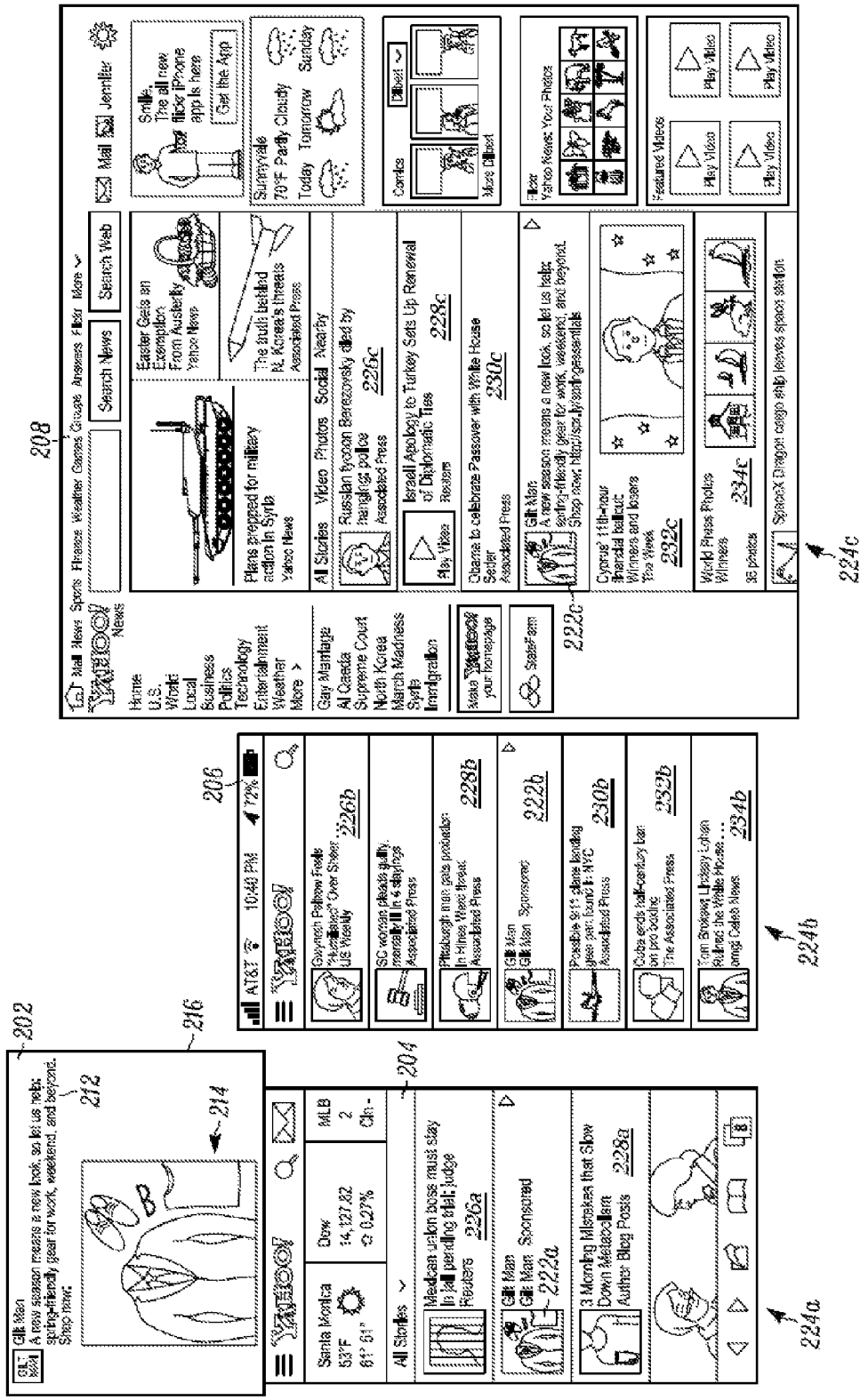
FIG. 2 illustrates example streams of content items and data items.

FIG. 2 illustrates streams of content items and data items displayed on selected user devices. The content items and data times displayed may be provided by a content network 300 of FIG. 3, and the selection and pricing of these items and/or keywords may be optimized via modules illustrated in FIG. 3. In FIG. 2, a display ad 202 is illustrated as displayed on a variety of displays including a mobile web device display 204, a mobile application display 206 and a personal computer display 208. The mobile web device display 204 may be shown on the display screen of a mobile handheld device such as a smartphone. The mobile application display 206 may be shown on the display screen of a portable device such as a tablet computer. The personal computer display 208 may be displayed on the display screen of a personal computer (PC).

The display ad 202 is shown in FIG. 2 formatted for display on a user device but not as part of a stream to illustrate an example of the contents of such a display ad. The display ad 202 includes text 212, graphic images 214 and a defined boundary 216. The display ad 202 is developed by an advertiser for placement on a webpage sent to a user device operated by a user. The display ad 202 may be placed in a wide variety of locations on the webpage. However, the defined boundary 216 and the shape of the display ad must be matched to a space available on a webpage. If the space available has the wrong shape or size, the display ad 202 may not be useable.

To overcome these requirements and limitations, the display ad 202 may be reformatted or alternately formatted for inclusion in a stream of content items and advertising items including a stream ad incorporating contents of the display ad 202.

In these examples, the display ad is shown as a part of streams 224a, 224b, and 224c. The streams 224a, 224b, and 224c include a sequence of items displayed, one item after another, for example, down a webpage viewed on the mobile web device display 204, the mobile application display 206 and the personal computer display 208. The streams 224a, 224b, and 224c may include any type of items. In the illustrated example, the streams 224a, 224b, and 224c include content items and advertising items. For example, stream 224a includes content items 226a and 228a along with advertising item 222a; stream 224b includes content items 226b, 228b, 230b, 232b, 234b and advertising item 222b; and stream 224c includes content items 226c, 228c, 230c, 232c and 234c and advertising item 222c. Each of the streams 224a, 224b, and 224c may include any number of content items and advertising items. In an example, the streams 224a, 224b, and 224c may be arranged to appear to the user to be an endless sequence of items so that as a user of a user device on which one of the streams 224a, 224b, or 224c is displayed scrolls the display, a seemingly endless sequence of items appears in the displayed stream.

The content items positioned in any of streams 224a, 224b, and 224c may include news items, business-related items, sports-related items, etc. Further, in addition to textual or graphical content, the content items of any stream may include other data as well, such as audio and video data or applications. Each content item may include text, graphics, other data, and a link to additional information. Clicking or otherwise selecting the link re-directs the browser on the user's device to a webpage referred to as a landing page that contains the additional information.

Stream ads like the advertising items 222a, 222b, and 222c may be inserted into the stream of content, supplementing the sequence of related items, providing a more seamless experience for end users. Similar to content items, the advertising items may include textual or graphical content as well as other data such as audio and video data or applications. Each advertising item 222a, 222b, and 222c may include text, graphics, other data, and a link to additional information. Clicking or otherwise selecting the link re-directs the browser on the user's device to a webpage referred to as a landing page.

While the example streams 224a, 224b, and 224c are shown with a single visible advertising item 222a, 222b, and 222c, respectively, any number of advertising items may be included in a stream of items. Also, the advertising items may be slotted within the content, such as slotted the same for all users or slotted based on personalization or grouping, such as grouping by audience members or content. Adjustments of the slotting may be according to various dimensions and algorithms. This concept of slotting is just one of many Internet marketing strategies that can be optimized by the SEMO or one of the other systems, modules, or operations described herein. For example, SEM and SEM optimization are other Internet marketing strategies that can be optimized by the systems, modules, and operations described herein.

Overview of Modules Included or Associated with SEMO

Figure 3:
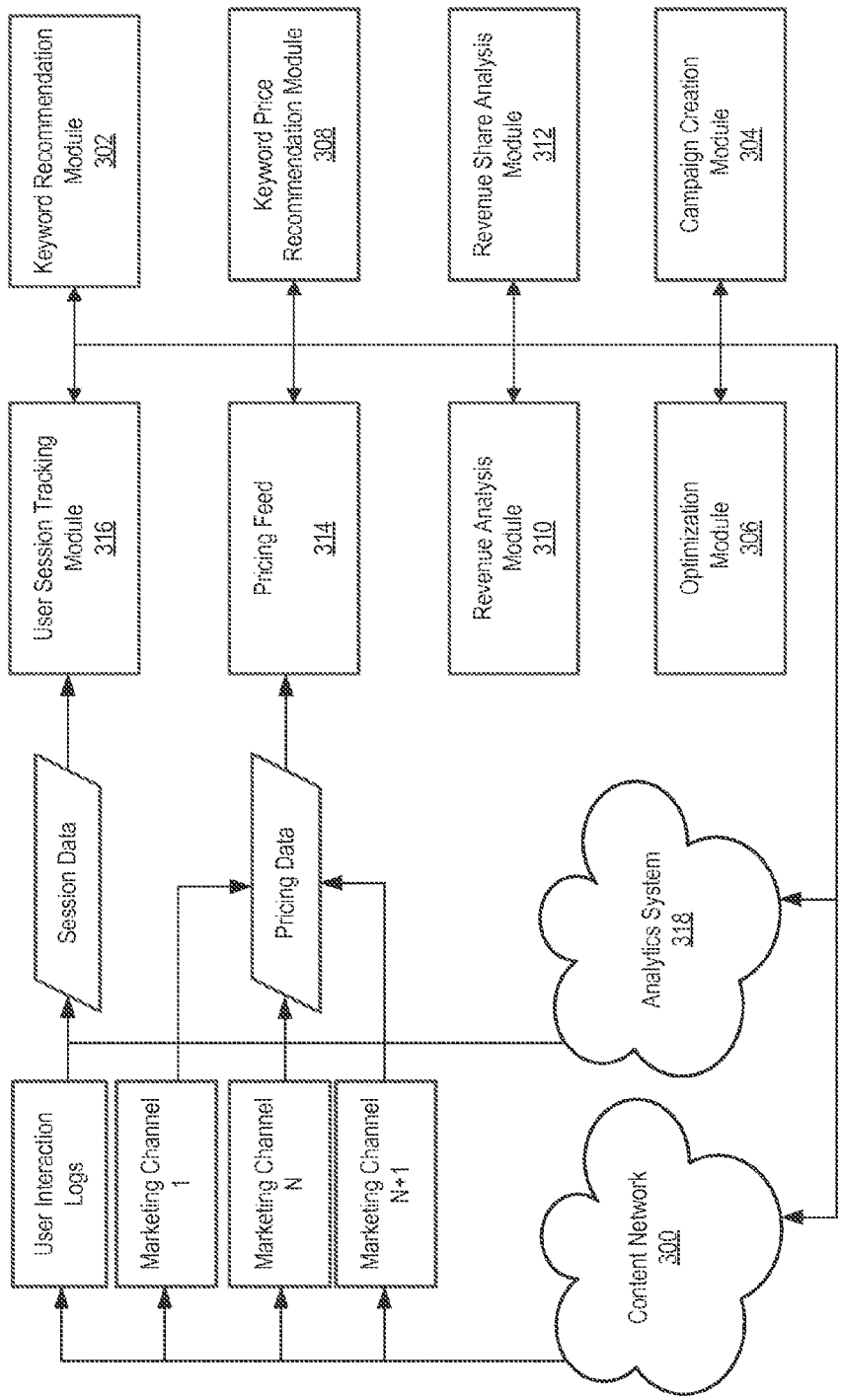
FIG. 3 illustrates a block diagram of example modules associated with the SEMO.

FIG. 3 illustrates modules included in and/or communicatively coupled with a SEMO server, such as the SEMO server 116. Also, each of the modules may be hosted by one or more servers, such as one or more of the servers of FIG. 1. FIG. 3 also includes a content network 300 that can be optimized, at least with respect to SEM, by the modules. The modules may include a keyword recommendation module 302, a campaign creation module 304, an optimization module 306, such as for optimizing campaigns, a keyword price recommendation module 308, a revenue analysis module 310, a revenue share analysis module 312, a pricing feed 314, and a user session tracking module 316.

The keyword recommendation module 302 may receive user session data and/or pricing data to base recommendations for keywords for a SEM campaign. The user session data, such as web browsing session data, may be received from user interaction logs on Internet browsing activity, such as the activity illustrated in FIG. 2. The pricing data may be received from various marketing channels hosted by various types of content and advertising marketing systems. The campaign creation module 304 may create ad and/or content marketing campaigns and the optimization module 306 may optimize such campaigns. The keyword recommendation module 302 may provide keyword recommendations for campaigns created by the campaign creation module 304 and optimized by the optimization module 306.

The keyword price recommendation module 308 may receive session data and/or pricing data. The keyword price recommendation module 308 may provide keyword price recommendations for campaigns created by the campaign creation module 304 and optimized by the optimization module 306. The revenue analysis module 310 may provide processed and analyzed session data and pricing data to the aforementioned modules.

The revenue share analysis module 312 may provide revenue sharing recommendations to a content network provider and/or partners of the content network provider. Such revenue sharing recommendations may be provided to campaigns created by the campaign creation module 304 and optimized by the optimization module 306. The pricing feed 314 may provide raw or processed pricing data to the aforementioned modules, and the user session tracking module 316 may provide raw or processed user session data to the aforementioned modules.

FIG. 3 illustrates the analytics system 318 providing some of the user session data and/or the pricing data. It should also be noted, as depicted in FIG. 3, each module can provide input and feedback to the other modules, the analytics system 318, and the content network 300, for enhancements and adjustments.

In an example first stage, keywords mined from audience traffic logs by a keyword miner can be recommended or communicated to a referral database to be eventually recommended. Recommendations can be made to an SEM opportunity explorer or a revenue attributor. The revenue attributor can attribute revenue to different keyword and search engine combinations via revenue logs and/or a revenue related feed, such as the pricing feed 314. Attributions and reports generated by the attributor can be encrypted a communicated to an SEM agency. The SEM agency can create, monitor, and optimize SEM campaigns according to such keyword, search engine, and revenue related referral and reporting.

In another example, a webpage can provide a search tool, a content stream (where selecting an item in the stream results in an online presentation of corresponding content), and various sources of revenue, such as advertisements. In such an example, SEMO operations associated with an end user may be associated with the webpage or a collection of related webpages including the aforementioned elements. In another example, the content provider providing content listed in the depicted webpage also can provide the search engine services and the SEM services from an information system. Additionally or alternatively, the information system may exchange information with other information systems, such as other systems providing one or more of content, search engine, or SEM services.

Keyword Recommendation Module

Figure 4:
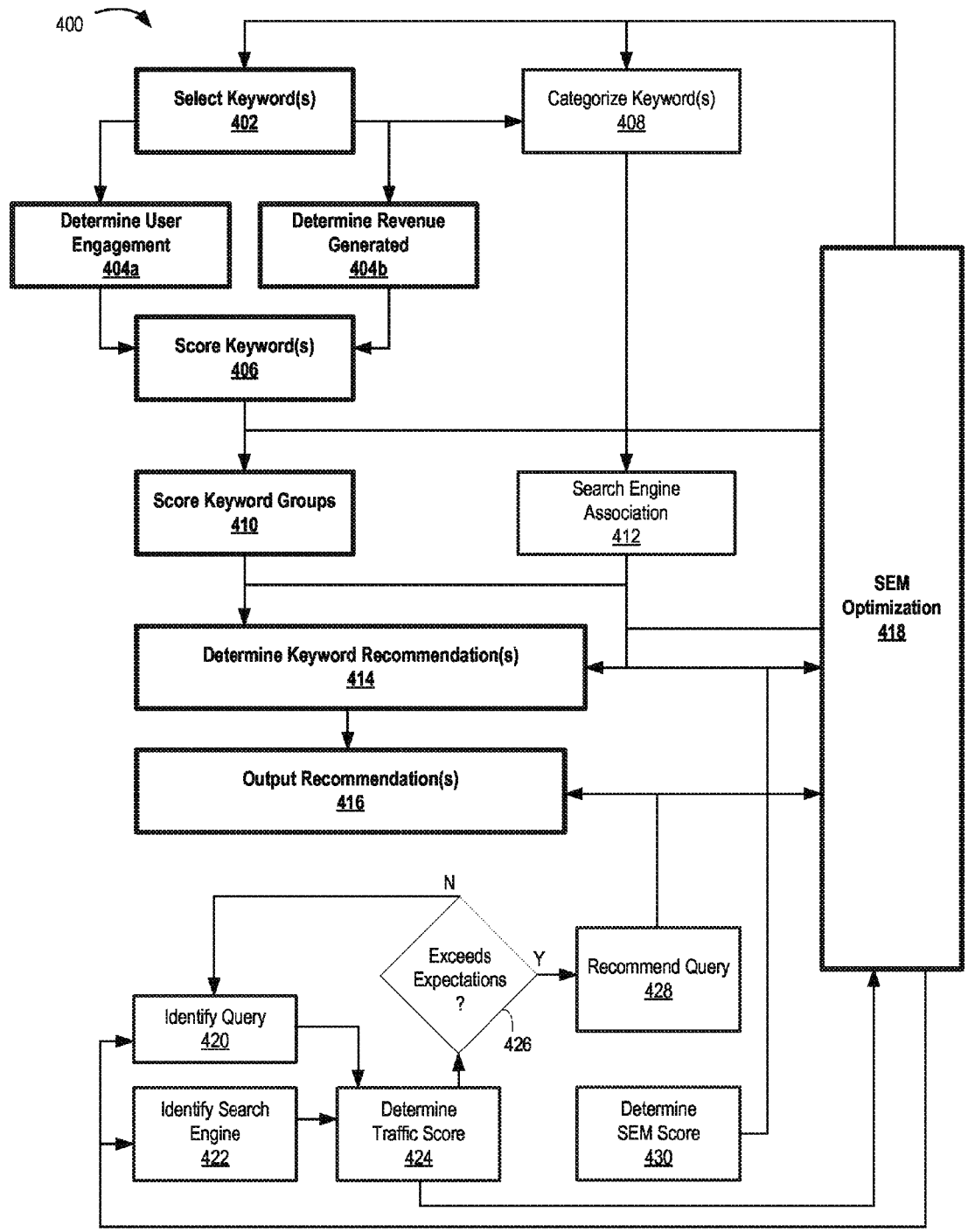
FIG. 4 illustrates example operations performed by an example keyword recommendation module.

In an example, a SEMO server, such as the SEMO server 116, may include and/or be communicatively coupled with a server that includes a keyword recommendation module, such as the keyword recommendation module 202, and/or an optimization module, such as the optimization module 206. FIG. 4 illustrates example operations 400 performed by an example keyword recommendation module and an example optimization module, such as the modules 202 and 206, respectively.

The keyword recommendation module may be configured to select one or more keywords for a search engine for use in a search engine marketing campaign, at 402. The keyword (s) may be normalized and/or associated with each other by a category, such as a content format category or a topic. The search engine in this example may provide more traffic to content (such as Internet content) of a publisher than other search engines, for the keyword(s). For example, the search engine may provide more traffic to certain content than the other search engines for certain keyword(s), and another search engine may provide more traffic to that certain content than other search engines, for other keyword(s).

The keyword recommendation module may also be configured to determine, such as per keyword or per group of related keywords, user engagement with the content of the publisher, at 404*a*. The user engagement results from the traffic provided by the search engine for the keyword(s). User engagement may include or be determined according to one or more of time spent viewing the content, page views of the content, and dwell times. In an example, the determination of user engagement with the content can be according to application session data, such as Internet session data. Application session data (also referred to as session data) can be provided by a data feed, such as the pricing feed 214.

The keyword recommendation module may also be configured to determine, per keyword or per group of related keywords, revenue generated from the content of the publisher, at 404*b*. Similarly, the revenue generated from the content can be determined according to session data associated with the traffic, and according to pricing associated with the session data. Such information can be received from a data feed, such as the pricing feed 214. The session data and the pricing associated with the session data may include, respectively, one or more of: total impressions generated and price per impression, and total clickthroughs and price per click.

The keyword recommendation module may also be configured to score, per keyword or per group of related keywords, the keyword(s) according to the determined user engagement with the content and/or the determined revenue generated from the content, at 406. In one example, the determined engagement and the determined revenue generated is with respect to engagement and revenue that stems from search results resulting from queries including the keyword(s). These results may be Internet search results with links to content, such as the content of the publisher.

The keyword recommendation module may also be configured to categorize keywords, such as by topic and/or some other predetermined categorization type, at 408, into groups. The module can then score the groups according to the scoring of the keywords, for example, at 410. Categories and categorization types may be determined manually or automatically through artificial intelligence. Besides content topic other categorization types may include, device type of user that facilitated the engagement or revenue, and user type, such as demographic or psychographic of the user. User type may be generated from location profiles, interests profiles, and/or stored contact information. In an example, categorization of a keyword may be by the search engine that provides the most traffic for that keyword. Alternatively, keywords can be associated with search engines for other reasons, such as the search engine that provides the most traffic for a keyword group associated with that keyword. Also, traffic distribution for a keyword, historical click-through rates associated with a keyword and corresponding content, and historical return on investment can be a basis for associating a keyword with a search engine.

In such a case, that search engine may not provide the most traffic for the keyword associated with the key group. As depicted, the keyword recommendation module may also be configured to associate the keywords with the certain search engine, at 412, and another type of categorization.

The keyword recommendation module may also be configured to generate keyword recommendations according to the scoring of the keywords, at 414. The keyword recommendations, additionally or alternatively, may be based on the categorization at 408, the group scores resulting from 410, and/or the search engine association at 412. The keyword recommendations may include a ranking of the keywords. A keyword ranking may be represented by a number, a number of stars or another icon, and/or the like. The keyword recommendation module may also be configured to output the keyword recommendations for presentation via a user interface, such as for presentation via a graphical user interface on a display device, at 416.

The optimization module, such as the optimization module 206, may be configured to optimize, initially, the search engine marketing campaign, at 418, according to the scoring of the keywords, the association of the keywords with the search engine, and/or the grouping by any other type of categorization, for example. Also, the optimization module may be configured to optimize the search engine marketing campaign according to the user engagement and/or the revenue generated, such as per keyword, per group of related keywords, per search engine, or per item of content, before or after the initial optimization of the search engine marketing campaign at 418. Also, the search engine marketing campaign optimization at 418 and/or data generated from analysis of such optimization can provide added input(s) for the keyword selection at 402, the categorization at 408, the scoring at 410, the search engine association at 412, and/or the recommendations at 414. Furthermore, in some examples each one of these processes explained for FIG. 4 can provide feedback to another process depicted in the figure. Such feedback can further the optimization at 418.

In an example, additionally or alternatively, the keyword recommendation module may be configured to identify a search query at 420, such as a query including one or more keywords. The search query may be a query of a set of queries. The search query may lead to an amount of Internet traffic to a website. The search query may occur at a search engine of a set of search engines. The keyword recommendation module may also be configured to identify the search engine of the set of search engines, at 422.

The keyword recommendation module may also be configured to determine a traffic score corresponding to the amount of Internet traffic to the website, caused by the query, and a market share of the search engine relative to the other search engines of the set of search engines, at 424. The keyword recommendation module may also be configured to determine whether the traffic score exceeds expectations, at 426. Expectations being associated with the expected traffic to the website resulting from a search engine, considering the market share of the search engine, for example.

The determining of whether the traffic score exceeds expectations may include comparing the traffic score to at least one other traffic score corresponding to at least one other search query of the plurality of search queries. The at least one other search query occurring by at least one other search engine of the set of search engines. The search query and the at least one other search query may each include at least one same keyword. The determining exceeding expectations may also include comparing search engine market shares for the search engine and the at least one other search engine.

Additionally or alternatively, the determining of whether the traffic score exceeds expectations may include determining whether the traffic score is greater than the at least one other traffic score. In such a case, the determining whether the traffic score exceeds expectations may also include determining whether the market share for the search engine is less than the market share for the at least one other search engine. Also, the determining whether the traffic score exceeds expectations may include identifying whether the traffic score exceeds expectations. Expectations may be exceeded as a result of the traffic score being greater than the at least one other traffic score and the market share for the search engine being less than the market share for the at least one other search engine.

The keyword recommendation module may also be configured to select for recommendation the search query, as a result of the traffic score exceeding expectations, at 428. The selecting of the search query for recommendation may include selecting one or more keywords, such as selecting at least one same keyword in the search query and at least one other search query. A selection of the one or more keywords may be based on one or more respective keyword recommendations at 414.

The keyword recommendation module may also be configured to determine a search engine marketing score according to at least part of session data corresponding to use of and/or revenue generated by the website resulting from the search query, at 430. The search engine marketing score may be a ranking relative to other search queries. The keyword recommendation module may also be configured to use the search engine marketing score and/or the traffic score to optimize a search engine marketing campaign, at 418. Also, the selected search queries for recommendations at 428 and/or the determined respective search engine marketing scores at 430 can be outputted at 416. The search engine marketing score may also be used as a weight to adjust optimization or recommendations. Adjustments according to the search engine marketing score may be determined from aspects other than performance characteristics derived from keyword and query usage, such as average session length and page views.

In another example, the SEMO server, such as the SEMO server 116, may include or at least be in communication with a data-driven tool for keyword recommendations, which can determine keywords that increase traffic across determined online properties, such as determined webpages and online media streams of a publisher. The tool may include the keyword recommendation module and use it to profile a keyword with respect to a search engine for every page or stream view that is generated from a search engine referral of the search engine.

The profiled data can include keywords that are generating traffic from one search engine but not from a another or can include an effectiveness of each search engine at generating traffic for an ad, page, stream, and/or campaign, for example. The keyword recommendation module can use search traffic market shares for various search engines. The market shares may be according to quantified differences in market share for a keyword between search engines. With this quantification, a set of keywords can be selected for different SEM campaigns with various search engines. Also, campaigns can be set up so that one or more combinations and/or selections of search engines are used with one or more combinations and/or selections of search terms. In using multiple search engines for multiple terms, degrees in which the engines are used per term can differ. For example, if one engine is more effective at directing traffic to a property for a term than another, the degree in which that engine is used for that term may be greater. However, this is just one of many strategies of improving SEM that can be employed by the SEMO.

In another example, the keyword recommendation module can identify search queries originating from any known search engine that are driving any amount of traffic on a content publisher's property. The source of a referral, in such an example, can be determined by an IP address of the source. Where strategies that are more extensive are employed, the SEMO can communicate SEM data to and from search engine providers' servers, such as the search engine server 106.

In profiling search engines, per keyword, a keyword can be a normalized keyword or a set of related keywords can be grouped or canonicalized. For example, "car", "automobile", "vehicle", "cars", "autos" may be grouped and normalized in a data structure as one normalized search term, "car", and that one normalized keyword that encompasses several other associated terms may be a basis for a keyword profiling of a search engine.

In another example, keywords that create traffic on the publisher's property with a search engine that is higher than expected, given the market share of that search engine for that keyword, such search engines can be selected and recommended for that keyword by the keyword recommendation module. For example, each search engine may have an actual or expected market share for a search term or group of related terms. The market share may represent a number of queries a search engine receives or is expected to receive that include the search term or a term from a group of related search terms. Given a search engine's market share for a term, it is expected that a corresponding amount of traffic will be directed to the publisher's property. However, the amount of traffic that is direct can be variant. When the traffic exceeds an expected amount, given the market share for the search engine, that keyword is selected for that search engine providing the traffic that is higher than expected.

$SE_1(t)$ can represent a set of terms that referred traffic to a publisher's property from a first search engine. $SE_2(t)$ can represent the set of terms that referred traffic to the property from a second search engine. $SE_3(t)$ can represent the set of terms that referred traffic to the property from a third search engine. Given $SE_1(t)$, $SE_2(t)$, and $SE_3(t)$, an optimal delegation of the set of keywords to be used with the three different search engines, can be represented by $(SE_2(t) \cup SE_3(t))-SE_1(t)$, $(SE_1(t) \cup SE_3(t))-SE_2(t)$, or $(SE_1(t) \cup SE_2(t))-SE_3(t)$, for example.

An additional or alternative approach is to use basis points. A basis point for a given keyword can be used to estimate traffic that can be acquired for that keyword from a specific search engine. In an example, a basis point can be determined according to market share. For example, the first search engine may have a 10% market share for a term, the second search engine may have a 15% market share for the term, and the third search engine may have 15% market share for the term. A basis point, in a simple form, can be equivalent to the market share (such as a basis point equaling market share divided by 100). In such a case, the basis point for $SE_1(t)$ is 0.7 and the basis points for $SE2(t)$ and $SE3(t)$ are 0.15.

TABLE 1

| Keyword | Search Engine 1 Pageviews, $SE_1(k)$ | SE 1 gap based on $SE_1(b)$ = 0.7 basis points, $p_1(k)$ | Search Engine 2 views, $SE_2(k)$ | SE 2 gap based on $SE_2(b)$ = 0.15 basis points, $p_2(k)$ | Search Engine 3 views, $SE_3(k)$ | SE 3 gap based on $SE_3(b)$ = 0.15 basis points, $p_3(k)$ |
|---|---|---|---|---|---|---|
| k1 | 280 | 70 | 30 | 45 | 75 | 0 |
| k2 | 75 | 3425 | 750 | 0 | 90 | 660 |
| k3 | 400 | 1700 | 50 | 400 | 450 | 0 |

Table 1 describes an example amount of traffic historically to the publisher's property for keywords k1, k2, and k3 for each search engine (e.g., $SE_1(k)$, $SE_2(k)$, $SE_3(k)$). Also described is the basis points for each search engine (e.g., $SE_1(b)$, $SE_2(b)$, $SE_3(b)$). Given the amount of traffic and the basis points, potential traffic may be determined. For example, P(k), the max probable traffic across the engines, can be determined, which can be used as the basis of a recommendation. Also, individual probable traffic values per engine can be used in various calculations to base a recommendation. $P_{SE1}(k)$ describes the probable traffic for the first search engine. $P_{SE2}(k)$ describes the probable traffic for the second search engine. $P_{SE3}(k)$ describes the probable traffic for the third search engine. In an example, the maximum probable traffic and the probable traffic from each search engine, per search term, may be derived from Formulas 1a-1d.

$$P(k)=(Max(SE_1(k)/SE_1(b),SE_2(k)/SE_2(b),SE_3(k)/SE_3(b))) \quad (1a)$$

$$P_{SE1}(k)=\{SE_1(b)*P(k)-SE_1(k)\} \quad (1b)$$

$$P_{SE2}(k)=\{SE_2(b)*P(k)-SE_2(k)\} \quad (1c)$$

$$P_{SE3}(k)=\{SE_3(b)*P(k)-SE_3(k)\} \quad (1d)$$

Given the data in Table 1, for example:

$$P(k1)=(Max(280/0.7,20/0.15,100/0.15))=Max(400, 200,500)=500;$$

$$P_{SE1}(k1)=70;$$

$$P_{SE2}(k1)=45; \text{ and}$$

$$P_{SE3}(k1)=0.$$

In this example, the recommendation may be to purchase the term k1 for the first and the second search engine, but not for the third search engine. Also, according to Table 1, for k2, the recommendation may be to purchase the term for the first and the third search engine, but not for the second search engine. For k3, the recommendation may be to purchase the term for the first and the second search engine, but not for the third search engine.

Keyword Price Recommendation Module

In an example, a SEMO server, such as the SEMO server 116, include and/or be communicatively coupled with a server that includes a keyword price recommendation module, such as the keyword price recommendation module 308. As depicted in FIG. 3, the keyword price recommendation module 308 can be communicatively coupled with the keyword recommendation module 302 and the optimization module 306. These three modules can provide each other with inputs for optimized keyword selection and pricing.

Figure 5:
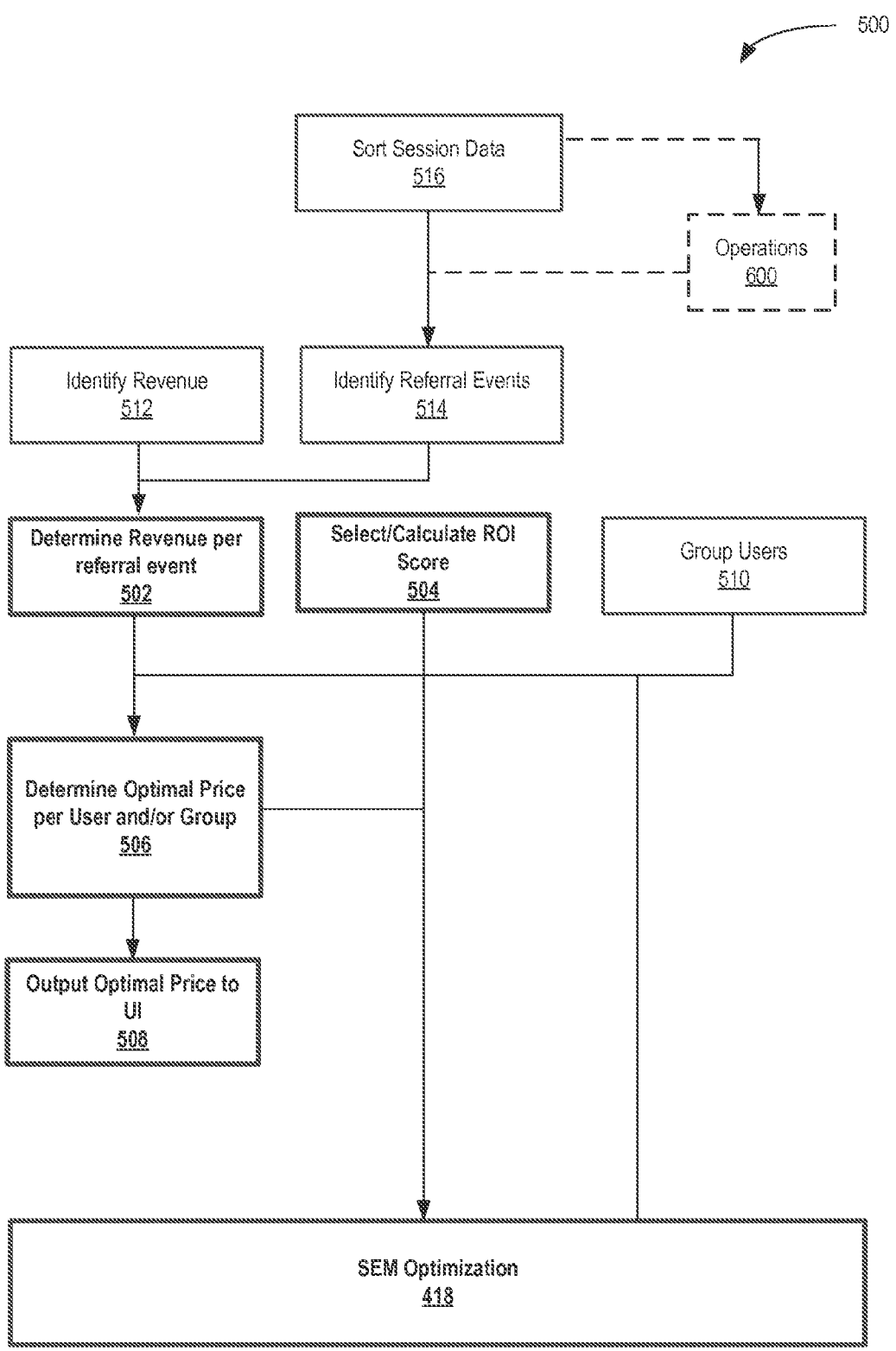
FIGS. 5 and 6 illustrate example operations performed by an example keyword price recommendation module.

FIG. 5 illustrates example operations 500 performed by an example keyword price recommendation module, such as module 308. The keyword price recommendation module may provide a recommendation including an optimal price for a keyword in a search engine marketing campaign, such an optimal price per referral event. Further, the price recommendation module may optimally price keywords in SEM campaigns per search engine. An optimal price may include a price that maximizes revenue by not being too high or low. For example, bids can be optimal when they produce more revenue than expected. The keyword being priced by the keyword price recommendation module may be selected by the keyword recommendation module and then communicated to the keyword price recommendation module. The keyword may be a normalized keyword and the keyword may be associated with other keywords, such as being part of a query including multiple keywords. In an example, the keyword price recommendation module can also recommend pricing for a query and/or a set of keywords.

The keyword price recommendation module may be configured to determine revenue generated per referral event for a keyword according to a number of referral events for the keyword for a plurality of users and revenue generated for the keyword by the plurality of users, at 502. A referral event may be a first visit of a user to a publisher's content. In such a case, the first visit may be attributed to a link resulting from a search using the keyword.

The revenue generated per referral event may be an average revenue generated per referral event. Alternatively or additionally, the revenue generated per referral event may be a total amount of revenue generated per a type of referral event. The revenue generated per referral event may also be a minimum revenue or a maximum revenue generated per referral event. Average revenue per referral event may be a mean revenue, a median revenue, or a mode revenue. For example, the average revenue per referral event may be the revenue that occurs the most for a referral event.

The keyword price recommendation module may also be configured to select and/or calculate a return on investment (ROI) percentage for the keyword, at 504. A calculation of the ROI percentage may be according to one or more market conditions. The market condition(s) may include a demand for the keyword. The market condition(s) may also include an average market price for the keyword per referral event or per type of referral event. The market condition(s) may also include a minimum and/or a maximum market price for the keyword per referral event or per type of referral event. An average market price may be based on a mean, a median, or a mode of the market price.

The keyword price recommendation module may also be configured to determine the optimal price for the keyword according to the revenue generated per referral event and the return on investment percentage, at 506. For example, the price recommendation module may use average revenue as a bid price for one or more keywords in an SEM campaign. The keyword price recommendation module may also be configured to output the optimal price for presentation via a user interface, such as for presentation via a graphical user interface on a display device, at 508.

The determination at 506 may also be used by the optimization module to further optimize a SEM campaign, such as via the SEM optimization at 518 (depicted in FIGS. 4 and 5). Where the revenue generated per referral event is a total amount of revenue generated per a type of referral event, optimal price for the keyword per referral event type may be determined according to the revenue generated per referral event type, the average revenue generated per referral event, and/or the return on investment percentage.

According to an example, in Formula 2, b(k) represents an optimal price for a keyword, where P is a ROI percentage, R(k) is the total revenue generated for the keyword, and E(k) is the total number of referral events associated with the keyword, such as the number of referral events resulting from a search using the keyword.

$$b(k)=(1-P/100) \times R(k)/E(k) \quad (2)$$

The determination and the output of the optimal price for the keyword may be per group of users of the plurality of users. The keyword price recommendation module may be configured to group the plurality of users, at 510. In an example, the determination and the output of the optimal price for the keyword may also be per individual user of the plurality of users. The grouping of the plurality of users may be according to a search engine most frequently used by a user. The grouping of the users may also be according to a marketing channel most frequently used by a user. In Formula 3, b(k,c,r) represents an optimal price for a keyword with respect to a marketing channel and/or referring search engine, P is a ROI percentage, R(k,c,r) is the revenue generated for the keyword relative to the channel and/or the search engine, and E(k,c,r) is the number of referral events relative to the channel and/or the search engine.

$$b(k,c,r)=(1-P/100) \times R(k,c,r)/E(k,c,r) \quad (3)$$

Further, a ROI weight M can be applied to Formula 4. The weight, for example, can be determined according to the following inputs: a market price of the keyword, a demand for the keyword, or another factor for determining value of the keyword. Formulas 4 and 5 are examples of how M can be applied.

$$b(k)=M \times R(k)/E(k) \quad (4)$$

$$b(k,c,r)=M \times R(k,c,r)/E(k,c,r) \quad (5)$$

The determination of the revenue generated per referral event for the keyword may also be with respect to a first time period (e.g., a long historical period) and a second time period (e.g., a short and recent period). The second time period may be more recent and significantly shorter than the first time period. For example, the first time period may be within a range of one month to multiple years from a present time, and the second time period may be within a range of one minute to one week from the present time. By making such a determination for multiple time periods, change in pricing over time can be better understood and provide for a more optimal keyword price. Formula 6 provides an example of how ROI weight M can be applied to such a model. In an alternative model, M can be replaced with (1-P/100) from Formulas 2 and 3.

$$b(k,c,r)=M \times (R_h+R_r) \quad (6)$$

where $R_h=R(k,c,r)/E(k,c,r)$ for a long historical period
where $R_r=R(k,c,r)/E(k,c,r)$ for a short and recent period The keyword price recommendation module may be communicatively coupled to a data feed, such as a pricing feed. For example, the keyword price recommendation module may be coupled to the pricing feed 314. The data feed may be configured to identify and provide the revenue generated for the keyword by the plurality of users, at 512. Also, the keyword price recommendation module may be communicatively coupled to a user session tracking module, such as the user session tracking module 316. The user session tracking module may be configured to identify and provide the number of referral events for the keyword for the plurality of users, at 514. The identification may be made through an analysis of user session data, such as an analysis of Internet user session data. In the case of using session data, the identifying of each referral event may be through an analysis of a time sorted stream of the session data, such as session data sorted at 516. Example sessionization operations 600, illustrated in detail in FIG. 6, include identifying existence of a referral event within session data, at 608.

The keyword price recommendation module, the user session tracking module, and the revenue data feed may be embedded in the same server or may be embedded on separate servers. As depicted in FIG. 3 such modules can be communicatively coupled and can provide input and/or feedback to each other (e.g., see modules 308 and 316 and the pricing feed 314). By having such modules coupled and by having them coupled to other modules discussed herein, latency in market feedback can be reduced.

The user session tracking module, in some examples, may be configured to identify and provide the number of referral events for the keyword for the plurality of users via session data. For example, the user session tracking module may be configured to identify each referral event for the keyword for a plurality of users, via session data of each user of the plurality of users. In such an example, a determination, such as by the session tracking module or the keyword price recommendation module, of a total amount of referral events may be made according to the session data. Further, a determination of a total revenue generated by the referral events may be made by either module or a data feed, such as a pricing feed. This determination of the total revenue may be made in accordance with the session data being linked to revenue data supplied by the pricing feed. The link may be based on referral event identifications, such as unique identification codes. Using such links, the revenue generated per referral event for the keyword can be determined according to the total amount of referral events and the total revenue. Also, the optimal price for the keyword can be determined according to at least the revenue generated per referral event. The price can then be outputted for presentation via a user interface.

Figure 6:
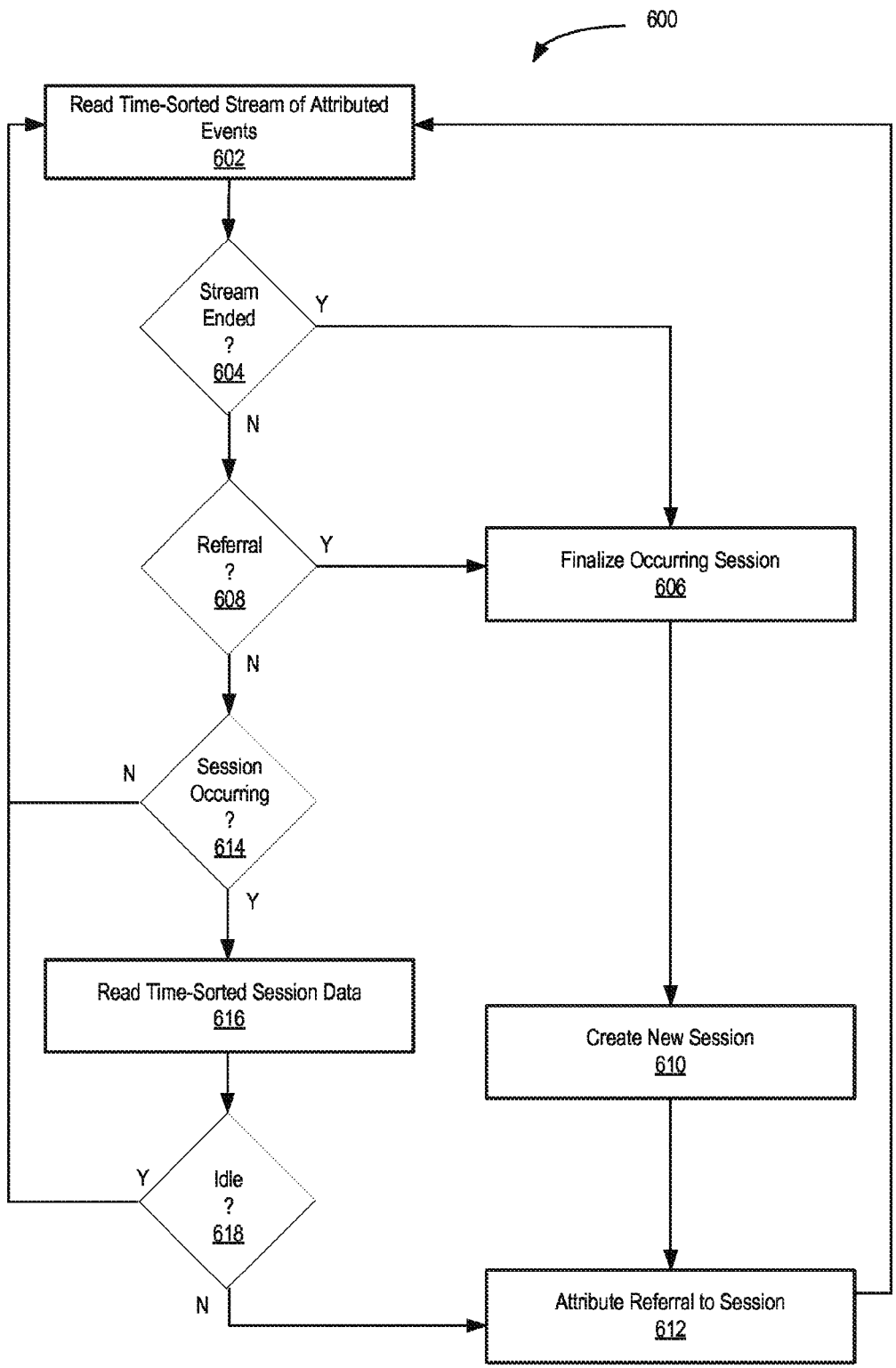

FIG. 6 illustrates example sessionization operations 600, performed by the user session tracking module, for identifying referral events to a publisher's property and/or an advertisement attributed to a keyword. The sessionization process can include reading a time sorted stream of attributed events of browsing activity for each user of a network of content, at 602. A stream may include attributed events of one or more browsing sessions of a user, for example. Where it is identified that the stream has ended at 604, recording and processing of the stream data can occur at 606 along with finalization of a current running session. With such operations, events succeeding a referral event, initiated with a keyword of interest, can be recorded before, after, and/or while the session is being terminated.

While a browsing session is occurring, a referral event can be identified, and upon being identified at 608, the recording and processing of the event may occur at 606 along with the finalization of a respective active session. This way, a new session can be created, at 610, and associated with the referral event, at 612. Also, where the stream has not ended but a session has been finalized, a new session may be created, at 610.

Whether a session has been finalized or is occurring can be determined, at 614. Where a session has ended, the sessionization process can return to reading the time sorted stream of browsing activity for each user of a network of content, at 602. Where that session is occurring, time sorted interactions by the user can be read and/or recorded, at 616.

It can also be determined whether a session is idle for a predetermined period of time, at 618. Where the session is idle for the predetermined period of time or more, such as being idle for thirty minutes or more, the sessionization process may return to reading a time sorted stream of attributed events of browsing activity for each user of a network of content, at 602. Otherwise, events occurring in the session may be attributed to the referral event at 612.

Content marketplaces can have market reserve pricing (MRP). MRP may be fixed at a minimum, such as one dollar, or may be based on demand for a keyword and/or quality of an advertiser, an ad, or content. Since revenue per referral event can be determined, such can be a factor for determining MRP for a keyword. This factor can also be complementary to other factors that may impact MRP. By factoring in value for a resultant session, we can possibly determine MRP that guarantees an acceptable ROI for revenue generating user events, such as revenue generating content clicks, revenue generating searches, revenue generating conversion events, which may occur after a search or a click.

Also, session based revenue and engagement can change over time in accordance with times of day, seasons, locations, demographic, and other variables. Such change can be tracked, such as by the user session tracking module, and accordingly, optimal pricing and/or MRP can be determined categorically. Such can also be applied to reserve minimum bid (RTB) prices for keywords, as well.

SEM can also take advantage of insights into revenue along with content and content attributes (like category of content, provider/publisher of content, license and pagetype). This helps identify key revenue streams within a property. It also helps identify content providers whose content is doing well in terms of monetization.

A holistic view of content and revenue along with user-session details may help optimize content categories. For example, this may facilitate identifying issues with monetizing specific content pool and taking corrective actions.

Furthermore, commerce properties may have a revenue sharing agreement with partners and affiliates of an SEM. The SEMO along with the pricing feed can be beneficial in attributing revenue to these partners and affiliates in general or to a user session level. The user session level can be broken down to a page-by-page feed, so that performance of specific pages or streams can be analyzed.

The SEMO server may also include an optimization module that further optimizes SEM campaigns based on revenue and engagement of a campaign. Data related to revenue and engagement can be obtain via the pricing feed, for example. Once a campaign is active, this module can provide feedback and optimize based on engagement generated from the determined keywords and revenue generated by the keywords. This module can also quantify revenue that an SEM campaign is generating and optimize bids for aspects of the campaign, such as bids on keywords per search engine, in a continuous feedback cycle.

In an example, a set of recommended keywords can be ranked by the optimization module using engagement metrics like page views and average length of a session associated with search engine referrals that are associated with at least one or more keywords of the recommended set. The ranking is data driven, and the data can come from various sources including the publisher's data storage services and external sources. Revenue metrics, such as average session revenue driven by referral queries, can be a basis for ranking keywords. Similarly, search engines can be ranked as well or a combination ranking of the keywords and search engines can be used. For example, "car" searched on a first search engine may be ranked higher than "car" searched on a second engine, but "car" for the second engine may be ranked higher than "truck" for the first engine.

Although much of the description herein has referred to webpages, other types of online properties, such as streams, can be equally implemented to interact with search engine providers and the SEMO. Besides webpages, streams are becoming common in online presentation because they provide flexibility for content providers who source content items for the stream, advertisers who source advertising items for the stream, and for the online provider who combines the content items and the advertising items to produce the stream. A stream allows any number and size and shape of content items and advertising items to be included in the stream. The elements of the stream may be sorted by relevance or by any suitable parameter. A stream also lowers the cognitive load on the viewer when processing when processing information associated with different items of content or advertisements by removing the cognitive overhead associated with switching to a different visual format or perspective.

The stream may be viewed as a unified marketplace where content items and advertising items compete for placement or inclusion in the stream. The participants in the marketplace are advertisers who sponsor or provide the advertising items and content providers who sponsor or provide the content items. The stream and the marketplace may be hosted or managed by an online provider. The online provider may also provide ads for its own products and services or its own content items to the stream, which is also the case for webpages.

In an example, a stream or page may be viewed in a marketplace using market reserved pricing (MRP) and/or real-time bidding. MRP can be fixed at a minimum, such as 10 cent. MRP can also be based on demand for a keyword and a quality of an advertisement or advertiser. In an example, for an incoming page view on a page or stream referred by a search engine, the SEMO can associate the total display revenue for a resultant session. This association can be done for an exact keyword from a search engine, or a normalized keyword for example. Also, an actual monetary value can be estimated for the resultant session. This value can be used as a factor in a calculation of a market reserve price for a keyword. In other words, market reserve price based on a value for the traffic that the search term is bringing for a property can be obtained. This value may be complementary to the other factors that affect MRP. Additionally, factoring in the value for the resultant session, the SEMO can closely approximate MRP. The close approximation should guarantee a desired ROI on a keyword search.

In addition, session revenue can change over time. Revenue can change over time based on day parting, location, seasonality, device, and demographic of an end user who is viewing an online property. Also, since session revenue can change rapidly, the SEMO can also apply its modules to a marketplace setting reserve minimum bid prices in a real-time bidding marketplace. With an automated low latency feedback, the SEMO can assure that such a marketplace has a valid minimum bid for each keyword relative to search engines, locations of a user, demographics, device of the user, and other criteria.

Besides optimizing pricing and revenue streams, the SEMO can determine relative improvements to online content according to results of the functions described herein. Content first published and not changed by the SEMO can be considered as a starting point and as a baseline for that content provider. As traffic to the content occurs, feedback data is provided and the SEMO can make recommendations for updating the content. Not only can this improve content, but it can also provide real-time estimates of the value of the content.

Much of this disclosure has been illustrated through example systems and methods used by content providers and search engine providers; however, advertisers may also interact with equipment of a content provider or a search engine provider to create or provide online advertisements and may benefit from one or more aspects of the SEMO. Also, advertising data can be tracked for SEM, and profiles can be generated for search engines with respect to advertising data.

Online advertisements include advertising content stored in a database or other memory in association with identification of the advertiser and one or more bid amounts. The advertising content may include text or graphics or both and a link to a landing page to which the user's browser is redirected upon clicking the link. The bid amount represents an amount of money the advertiser will pay upon an event pertaining to the advertisement. The event may be an impression or viewing of the advertisement by a user, a click through or other selection of the advertisement by the user viewing the advertisement, or an action following viewing the advertisement such as providing credit card information or an email address. The bid amount may be used for determining position of the advertisement in search engine results in a manner to be described below. The online advertisement may include other data as well including data defining how the advertisement will appear in the search engine results.

The content items, which may at times be considered advertising, may include information on a topic that may be of interest to a user. This information may include a link to another webpage providing more information about the topic and a summary of information about the topic. In some examples, a content provider will associate a bid amount with a content item. Similar to bid amounts for advertisements, the bid amount for a content item may be based on an impression, a click through, or another action. Also, the bid amount may be used for determining position of the content item in the search results in a manner to be described below. Alternatively, a software based bidding agent may be employed to automatically bid on behalf of content items.

The content items and advertisement items are in competition for inclusion in a stream or webpage. For example, the competition for slots or areas in a stream or webpage may be cleared using a Generalized Second Price (GSP) auction mechanism. In a GSP auction, the highest bidder gets the first slot, the second highest bidder gets the second slot, and so on. However, the highest bidder then pays the price bid by the second highest bidder. This is similar to a sponsored search marketplace although the bids in sponsored search are expressed differently and the competition in a sponsored search marketplace is only between advertisements.

In an example, an advertiser provides targeting predicates, an ad snippet and a bid. In some examples, the advertiser can provide a budget across multiple triples, referred to as targeting triples. Targeting predicates may be based on any type of market segment of interest to advertisers, including in an example, demographic markets, market segments based on gender or age, behavioral segments based on user profile information, or geographic markets. The bids may be cost per click (CPC) bids, cost per impression (CPM) bids or cost per action (CPA) bids. The online provider may choose not to support all bid types in all marketplaces.

What advertisers are allowed to bid for in large part determines their bidding behavior. For the online provider who manages the SEMO, there is a trade-off between allowing advertisers to bid for very specific targets versus allowing advertisers to bid for more broad targets.

The online provider may prefer markets that are thick with many competing advertisers to thin markets with few advertisers; and the thicker the market, the greater the potential for increased revenue to the online provider. However, many advertisers are very interested in specific types of user. These narrow-focused users will likely stay out of the marketplace unless they are allowed to bid more narrowly. Broad targets lower the average value an advertiser derives since their ads may be shown to users who may not be interested in their products. Lower expected values lead to lower bids.

Some of these trade-offs can be mitigated by pricing for performance, by using excellent scoring algorithms and by preventing ads of low relevance from showing in a stream or webpage. Pricing for performance implies charging only when a user responds to an advertisement. Advertisers would prefer to pay only when users convert, such as by paying for a product or service. However, defining and tracking conversions and estimating conversions rates may be difficult to do reliably, so marketplace operators prefer charging by clicks, which are more easily tracked and estimated. Charging per click can pose challenges. For example, not all clicks from users convert into sales for an advertiser. With too many clicks that do not result in a conversion, a low quality score for the ad may result. Much of the information associated with advertising performance can be obtain via the pricing feed, for example.

Broad targeting requires precise scoring methods to maintain good user and advertiser experiences. Scoring is the process of assigning a value to an advertisement or content item which value can then be used for determining which item should be included in the search result. This precise scoring may require that the online provider examine not just the ad snippet but also the contents of the landing page. In some examples, an advertisement may include additional information such as metadata that is automatically collected or manually provided by the advertiser and used as signals to the scoring function.

Broad targeting may also add a difficulty in pricing for CPC advertisements. In pricing the advertisement, it is important to distinguish between the quality of the match between a keyword and a search term and the quality of the advertisement. The online operator may choose to discount advertisers for poor quality matches, which are the responsibility of the operator of the online marketplace that does the matching. The online operator may choose to charge a premium for poor quality advertisements that are the responsibility of the advertiser.

In examples described herein, the content provider (or publisher) may take on various forms. One classification may include a publisher that aggregates content from partner content providers. In an example, such a publisher may aggregate content to one page or stream. In aggregate content presentations, a click lead to engagement and results in session data associated with the engagement. Another type of publisher mixes and matches (or personalizes) aggregated content per page or stream with respect to the end user receiving the content. Where personalization is present in the page or stream, sessions and content sources influence each other and session generation with different dwell times per source or per article become valuable information to a content provider and other parties of interest. Another example classification may include Rich Site Summary (RSS) aggregators, which include subscription-based content feeds. With RSS aggregators, sessions can provide valuable information; however, the sources of content may have less impact on each other than the other types of content providers. For example, with non-RSS providers, a content source's session revenue or traffic is more likely to be attributed to another source. In addition to using session information in general, the SEMO can use such relationship information between providers to enhance recommendations of keywords and pricing across search engines and other sources of content referrals.

Revenue Analysis Module

In an example, a SEMO server, such as the SEMO server 116, may include and/or be communicatively coupled with a server that includes a revenue analysis module, such as the pricing feed 314. As depicted in FIG. 3, the pricing feed 314 can be communicatively coupled to the keyword price recommendation module 308, the keyword recommendation module 302, and the optimization module 306. These four modules can provide each other with inputs for optimized keyword selection and pricing.

In particular, the revenue analysis module may provide attributed audience and advertising data, which may include interaction details for every instance of content viewed or interacted with by an end user. Such data may include audience data attributed to various content and/or advertising channels and sources. In an example, the revenue analysis module can utilized one or more keys with the data to join related data, such as joining related referral event data and revenue generating event data, across the channels and sources to provide relevant information to optimize distribution of content and/or an advertising campaign, such as an SEM campaign. Such relevant information may include revenue generated by revenue generating events per page referral event.

Figure 7:
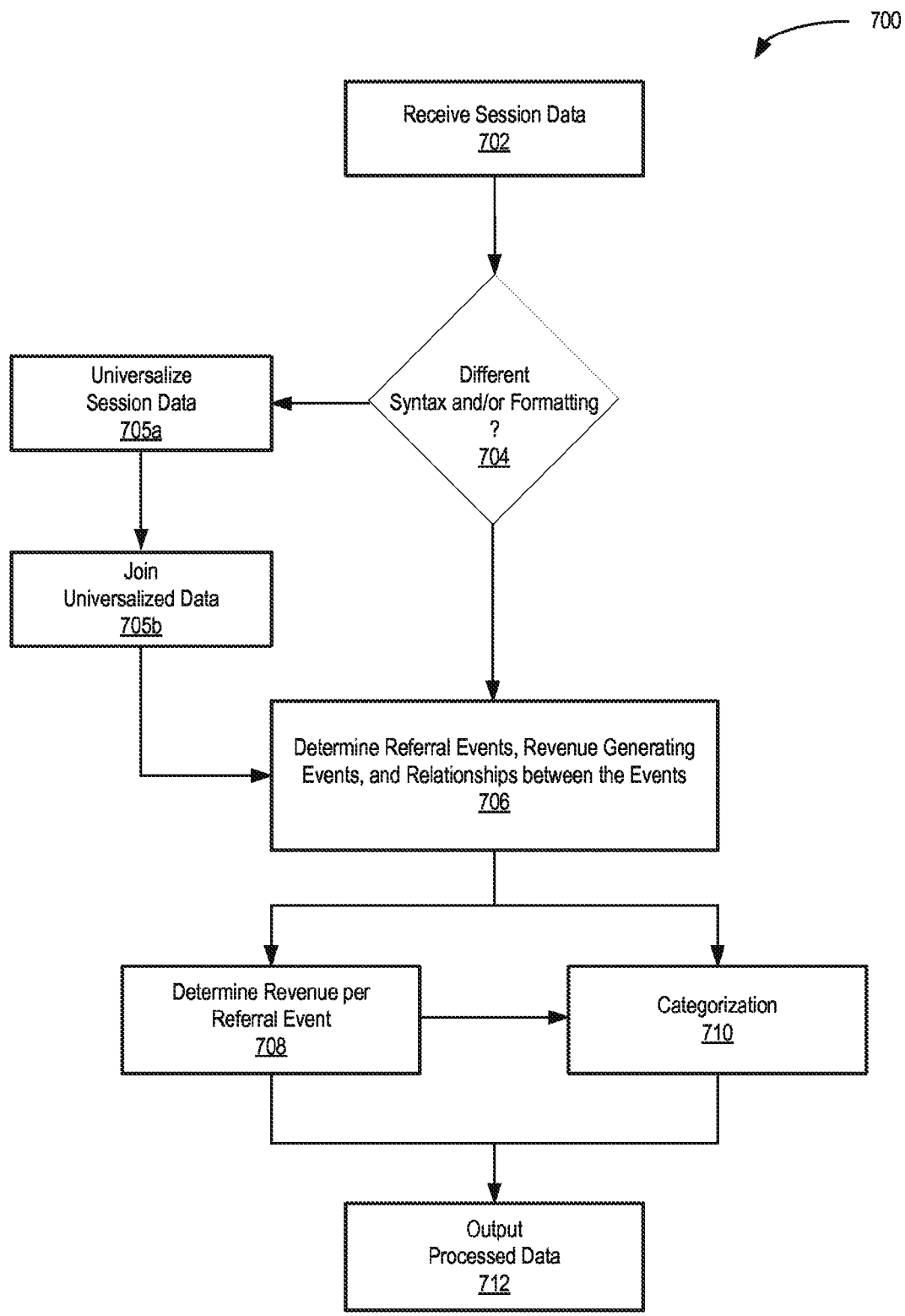
FIGS. 7 and 8 illustrate example operations performed by an example revenue analysis module.

FIG. 7 illustrates example operations 700 performed by an example revenue analysis module, such as the pricing feed 314. To simplify the description of the operations performed by the revenue analysis module, the description of FIG. 7 will focus on the processing of web browsing session data (session data). However, it should be understood that any type of data corresponding to audience viewing of and interactions with media can be used by the revenue analysis module. In an example, the revenue analysis module can use data corresponding to impressions of content viewed on a graphical user interface. For example, data corresponding to impressions on active windows can be used. Media can include any type of media including online and non-online types of media, such as Internet based media, radio, network television, cable television, and print media, for example.

In an example, the revenue analysis module may be configured to receive user web browsing session data, at 702. The session data can be received from an intermediary data feed, such as a feed providing preprocessed or un-processed Internet Protocol/Hypertext Transfer Protocol (IP/HTTP) data. Accordingly, the session data may be raw session data or preprocessed, such as preprocessed data from an analytics system (e.g., the analytics system 318). Such an analytics system may include a source-based and/or a content-based analytics system. The source of the feeds may be various content and/or advertising channels and sources, such as Internet marketing channels and sources including audience targeting channels, advertising content exchanges, guaranteed and non-guaranteed display sources, search advertising, unified market places, source-based and/or content-based analytics systems, and the like. Also possibly included are search engine sources such as data feeds of well-known search engines, and other types of Internet media sources such as search engine results, text, graphical, audio and/or video content, RSS blog data, and social media data. The module may also receive session data directly from devices, such as web-browsing devices, of the audience. The session data may include page view data, page interaction data, and page referral data. Components of the session data may be tagged with persistent tags that persist at any level of processing of the session data. Such persistent tags may include parameters for associating components of the page view data, the page interaction data, and the page referral data with each other.

In some examples, the session data can be received from multiple sources. Where multiple sources are used, the session data from these sources may include different syntax and/or formatting per source. To adapt to such scenarios, prior to processing of the session data, the revenue analysis module may be configured to determine whether different data syntax and/or formatting is being used amongst the sources, at 704. To handle different data syntax and/or formatting amongst sources, the revenue analysis module may be configured to universalize the session data by tagging, with keys, data components universal amongst the session data and/or data sources, at 705*a*. The revenue analysis module may also be configured to join the tagged data components by at least the keys, at 705*b*. In some examples, the data components universal amongst the user web browsing session data and the pricing data may include page view identifiers, ad impression identifiers, ad click identifiers, timestamps and/or price per page view, ad impression, and/or ad click. In some examples, click data may include timing data, device data, and other information pertaining to a click on content. The page view identifiers may be generated with every display request of the page or every ad request on that page. As for the ad impression identifiers and the click identifiers, a unique identifier may be generated with every corresponding ad impression and click.

The revenue analysis module may also be configured to determine webpage referral events, revenue generating events at a webpage, and relationships between the page referral events and the revenue generating events, according to at least part of the session data, at 706. In examples where there are multiple sources with data having varying formatting and syntax, the revenue analysis module may be configured to determine webpage referral events, revenue generating events at a webpage, and relationships between the page referral events and the revenue generating events, according to at least part of the universalized session data, such as the data universalized at 705*a*, which may include the joined data components, such as the components joined at 705*b*.

The page referral event may include an event in which a user is directly or indirectly directed to a webpage. For example, a page referral event may include a clicking of a link on a search results page or another type of page, which directs a web browser to monetized content of a publisher, directly or indirectly via an intermediate page. The revenue generating events may include events in which a user interaction with the webpage generates revenue, such as a monetized presentation of content, a sale of content, a sale of goods, or a sale of services. The revenue generating events may also include advertising events, such as ad impressions and clicks on ads.

Figure 8:
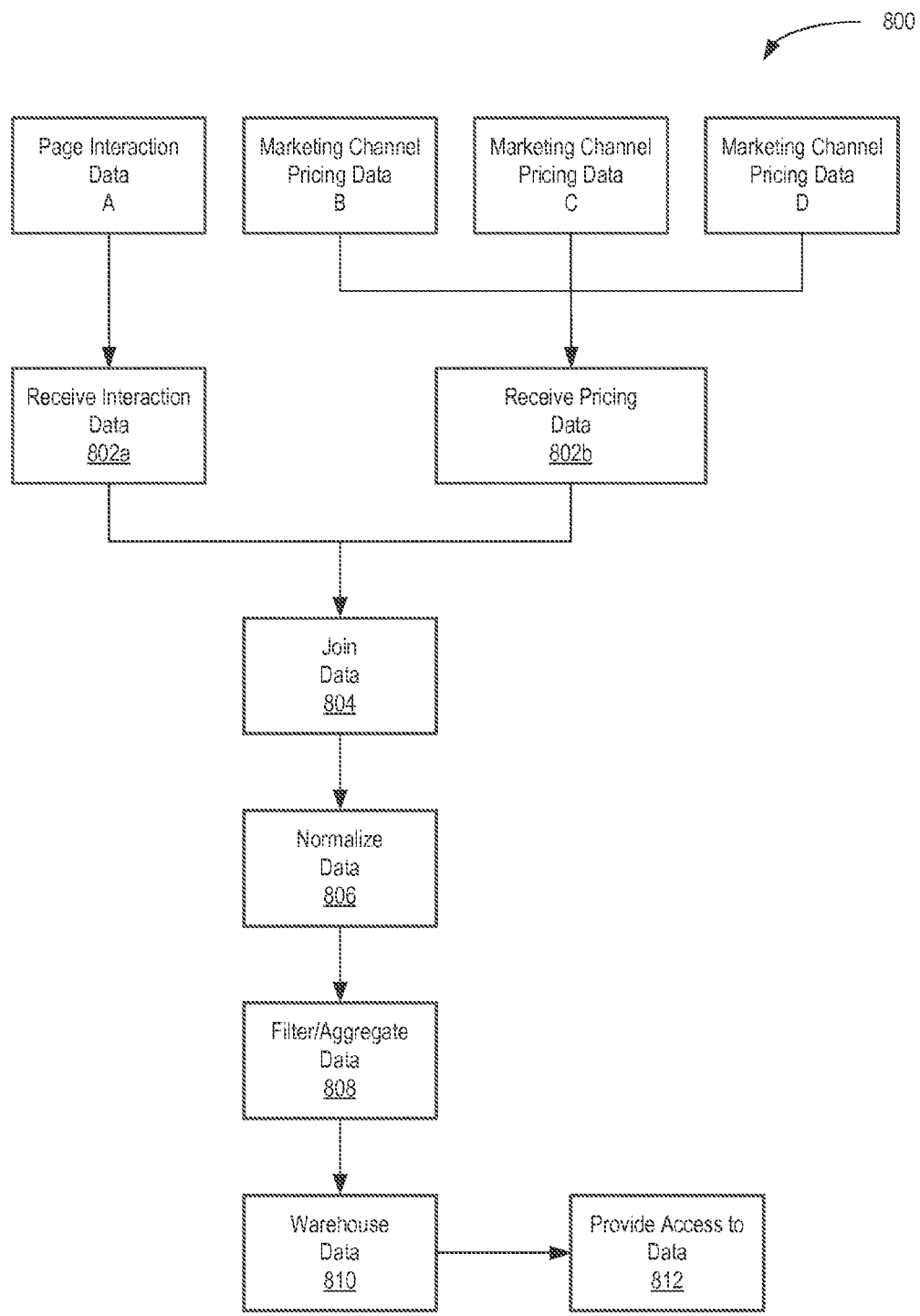

The relationships between the page referral events and the revenue generating events may be made by matching keys for the page referral events and the revenue generating events. These keys and joins between the keys may be implemented via some of the persistent tags, when such tags are included in the session data. FIG. 8 illustrates an example operation 800 performed by an example revenue analysis module. Operation 800 illustrates an example of how joins can be implemented across various sources of session data to create relationships between the page referral events and the revenue generating events. At 802*a*, upstream page interaction data can be received from various sources, such as from an audience interaction feed of a network of Internet content distributed through various marketing channels. At 802*b*, upstream revenue data can be received from various sources, such as from various revenue data feeds of the various marketing channels including revenue data feeds of audience targeting channels, advertising content exchanges, guaranteed and/or non-guaranteed content and/ or advertising sources, search advertising sources, unified market place advertising and content publishing sources, source-based and/or content-based analytics systems, search engine sources, social media sources, RSS sources, and sponsored search advertising sources.

At 804, the upstream page interaction data can be joined with the upstream revenue data by keys associated with the data sources, content and/or advertisement views and/or interactions, and/or timestamps. For example, one or more interaction keys, which may be derived from a timestamp and/or alphanumeric codes associated with an interaction by a user with a page, may be matched with one or more revenue keys, which may be derived from a corresponding timestamp and alphanumeric codes associated with pricing associated with the interaction. Such matches between data representing interactions with content and data representing revenue generated by that content may be with respect to a first predefined period of time. Matches between data representing interactions with advertisements and data representing revenue generated by those advertisements may be with respect to a second predefined period of time.

At 806, the joined data may be normalized, which may include one or more rounds of normalization and rejoining of the data. For example, respective data from each source may be normalized and joined by data source pairs. To clarify, page interaction data from source A and pricing data from source B may be normalized and joined to provide joined data set AB, and the interaction data from source A and pricing data from source C may be normalized and joined to provide joined data set AC. Normalized data sets AB and AC may be further normalized and joined to provide normalized data set ABC. The normalization and rejoining may be repeated for each possible combination of interaction sources (such as source A) with pricing sources (such as sources B, C, and D). For example, data sets AB and AD may be further normalized and joined to provide normalized data set ABD, and then normalization and rejoining can occur to provide ABCD from normalizing and joining ABC and ABD data sets.

At 808, the normalized data may be filtered and/or aggregated. For example, the normalized data may be filtered and/or aggregated by various categories, such as by marketing channel sources, search engine sources, Internet media sources, general media sources, advertising dimensions, and audience dimensions. The various categories are described in detail below. At 810, the normalized data and the categorized data can be data warehoused, such warehoused in a database management system. At 812, the warehoused data can be accessed by various modules for various purposes, such as determining revenue generated by revenue generating events per page referral event. In an example, the warehousing operations and access of warehoused data can be delayed for a predefined period of time, such as an hour, a day, or even a week, to insure data consistency. These operations can occur periodically by automated scheduling. As for the other processes of FIG. 8, these processes may occur in real time, where the speed of these operations may be dependent on processing resources and network bandwidth.

Referring back to FIG. 7, the revenue analysis module may also be configured to determine revenue generated by the revenue generating events per page referral event of the page referral events, according to the relationships between the page referral events and the revenue generating events, at 708. For example, this determination may be made in accordance with the various data sets derived from the joining and normalization illustrated in FIG. 8.

The revenue analysis module may also be configured to categorize the page referral events, the revenue generating events, the relationships between the page referral events, and/or any derivative thereof, at 710. The categories of the categorization of the page referral events, the revenue generating events, the relationships between the page referral events, and/or any derivative thereof, may be recorded within the session data via persistent tags that persist at any level of processing of the session data. Also, the categories of the categorization of the page referral events, the revenue generating events, the relationships between the page referral events, and/or any derivative thereof, may be enabled by keys and joins by keys.

The categories may include marketing channel sources, search engine sources, Internet media sources, general media sources, advertising dimensions, and audience dimensions. Marketing channel sources may include audience targeting channels, advertising content exchanges, guaranteed and/or non-guaranteed content and/or advertising sources, search advertising sources, unified market place advertising and content publishing sources, source-based and/or content-based analytics systems, and sponsored search advertising sources, for example. Search engine sources may include data feeds from well-known search engines, such as YAHOO!, GOOGLE, and BING. Internet media sources may include categorization by Internet technology source, such as search engine results, online social media posts, RSS blogs, and the like. Internet media sources may also include categorization by content medium type, such as text, graphical, audio and/or video content medium. General media source categories may include convention broadcast television and/or radio channels, online media channels, print media channels, billboard channels, and the like. Categories by advertising dimensions may include advertisement size with respect to data size or geometric size, mode of delivery, such as through rich media or image format (e.g., JPEG or GIF), revenue sharing details, ad booking details, campaign strategies, and brand or lines. Audience dimensions may include demographics, locations, devices, media service providers, and telecommunication service providers. Audience dimensions may also include bucketization details, such as differences between a new content and a prior version of that content, webpage section details, and web link type and/or information.

The revenue analysis module may also be configured to output the revenue generated by the revenue generating events per page referral event of the page referral events, for presentation via a user interface, such as for presentation via a graphical user interface on a display device, at 712. The revenue analysis module may also be configured to output the revenue generated by the revenue generating events by the categorization of the page referral events, at 712. Also, the revenue analysis module may also be configured to output at least one of the page referral events, the revenue generating events, the relationships between the page referral events, or any derivative thereof, for presentation via the user interface, at 712. Further, the revenue analysis module may also be configured to output the at least one of the page referral events, the revenue generating events, the relationships between the page referral events, or any derivative thereof by their respective categorization.

Advantages of the revenue analysis module may include bucket analysis and optimization. For example, the revenue analysis module may provide assessments of revenue impact of user interface changes via ad and content targeting and personalization techniques. Also, a publisher or an advertiser may want to keep track of change in user interface design, backend algorithms, and/or marketing channels to assess impact of the changes on revenue. Also, provided is the facility to trend revenue and revenue ratios by audience attributes and metrics to identify and tag data anomalies (such as spikes and drops). For example, tracking bucket level ratios may identify variations in key metrics to forecast overall impact of iterative code changes on user-engagement patterns and/or personalization and/or targeting of content and advertising. Also, the facility to introduce ratios relevant to Internet sessions and downstream revenue impact of key anchor properties may provide for flagging issues with a specific funnel or acquisition channel for Internet properties and other types of media. Also, the granularity of the revenue analysis module provides for insight into revenue along with content and its attributes (such as category of content, provider of content, associated licenses, and media type).

Furthermore, combining a holistic view of content and revenue with session details may provide for optimization of categorizations, such as content categorization and content provider categorizations. Such optimization may also improve revenue generated from content provider partnerships. Providers of Internet properties and other types of media may have partners and affiliates with revenue sharing agreements of various levels of complexity. The facility to attribute revenue to these partners and affiliates on a session level may provide insight on the particularities of the performance of such partnerships and affiliations.

In an example, the pricing feed can provide a cost for each page view or stream event. This provides revenue for different types of ad services. The price recommendation module can use the pricing feed and determine a referring session revenue. This module can also attribute revenue generated during a session for each SEM referral. A SEM referral session can occur within an application or network communication session. In an example, a new referral session during an application or network session may terminate the existing referral session. The referral session may include end user interactions with the publisher's property. For example, click activity may be tracked. The interaction data may be the basis for determining expected revenue and may be used to determine whether a campaign should continue. Also, the data may be used to compare potential revenue or return on investment gained based on money reported to the pricing feed and what was actually spent.

In an example, the pricing feed may provide attributed audience and advertising data. Attribution can be or include a record, which has details for instances of a page or stream viewed online. Using the pricing feed, any engagement metric or dimension combination alongside revenue metrics or dimensions may be obtained. Such metrics and dimensions can be obtained from any advertising and content production pipelines, such as pipelines for display content (guaranteed or non-guaranteed), advertising (guaranteed or non-guaranteed), and search advertising. Using the obtained metrics and dimensions, granulized and generalized revue reporting and monitoring can occur across a publisher's properties. Also, various actions and decisions can be made according to analysis of the data provided by the pricing feed. For example, any data-driven decision described herein can be based on data obtained from the pricing feed.

In yet another example, the pricing feed can obtain attributed audience and advertising data, such as event level audience data with link-view join and traffic protection. Revenue metrics data can be obtained from production pipelines. The data can include traffic protection. Traffic protection may include exposing traffic protection annotations to data that insures data aggregated on the pricing feed versus data fed via upstream pipelines matchup according to criteria and logic across various systems, formats, and protocols. The pricing feed in these examples may act as a raw data feed to be further processed by a module of the SEMO, such as the revenue analysis module.

In an example, a webpage may include multiple areas generating revenue, such as the webpage 208 of FIG. 2. Each revenue generating area may be tied to a production pipeline. Each area may contribute to revenue differently. From a pricing perspective, the contribution of such page for a publisher's revenue is a sum of clicks on the different areas, for example. Revenue generation can be tracked from each area and in total.

In instances where the pricing feed takes advantage of joins across systems, as mentioned, keys can be determined to enable the joins. Determining appropriate keys can be a challenge. Keys may be standardized and/or aspects of the fed data may be converted into keys via normalization processes, for example. A view of a page or stream may include an identification, which may be used for a join. As mentioned, timestamps may also be used to join the data from various sources. Also, unique identifiers may be generated, such as a unique identification for each search recorded associated with a campaign.

Display data can come from various pipelines. Revenue metric feeds may be consumed by such feeds and unions on page or stream identifications with certain dimensional metrics from an audience based feed. In an example join, a certain amount of time can be determined for looking ahead of advertising and content viewing data, and a certain amount of time can be determined for looking back at similar type of data and/or search engine data.

Instructions, such as through the revenue analysis module, can be executed with on-grid components through a distributed data framework. These jobs are run using a server based scheduler, at hourly and daily frequencies; hence being on-grid. The scheduler may be specialized in running workflows based on time and data triggers. Off-grid pipeline components may include various databases and code libraries that take more time for data retrieval; and therefore, have delayed performance relative to on-grid components. Therefore, the pricing feed aggregation data may be loaded into the off-grid pipeline databases on hourly and daily frequencies set by the scheduler. The pricing feed data can be accessed and analyzed by code from the off-grid pipeline libraries.

With regard to the revenue analysis module and its feeds, experimentation and/or bucket analyses may provide ways to assess revenue impact of pages and streams and/or personalization and/or modeling changes. A provider may want to keep track of change in user interface design, backend code, and/or traffic acquisition channels to assess the positive or negative impact on revenue. Also, a provider may desire a complete view of impact on user engagement, solely or with respect to revenue. The SEMO's ability to track bucket level ratios may facilitate identifying variations in metrics and projecting the overall impact of iterative code changes resulting in change of user-engagement pattern. This can assist in online personalization and targeting. Also, ratios relevant to user-session and downstream revenue may influence design and implementation of online properties and/or flagging issues. Issue flagging can occur via funnel or acquisition channel associated with monitored properties.

Revenue Share Analysis Module

In another example, a SEMO server, such as the SEMO server 116, may be, include, and/or be communicatively coupled with a server that includes a revenue share analysis module, such as the revenue share analysis module 312. As depicted in FIG. 3, the revenue share analysis module 312 can be communicatively coupled to the keyword price recommendation module 308, the keyword recommendation module 302, the optimization module 306, and the pricing feed 314. These five modules can provide each other with inputs for optimized keyword selection and pricing and revenue share agreements.

In particular, the revenue share analysis module, similar to using arbitrage techniques to generate optimized keyword selection and pricing for SEM campaigns, can use similar techniques to generate optimized deals for revenue sharing of co-provided content. For example, a content network provider may have complex revenue sharing agreements with various types of content providers, from large electronic content publishers and television and radio broadcasters to mom and pop blogs. For each content item distributed by the content network there can be one or more user sessions representing interactions of one or more users with that content item. With the described technologies for providing user interaction session data and revenue generation session data, such as the revenue analysis module, value of content items and providers of those items can be determined. These values can then be used to negotiate revenue sharing agreements between co-providers of content.

Figure 9:
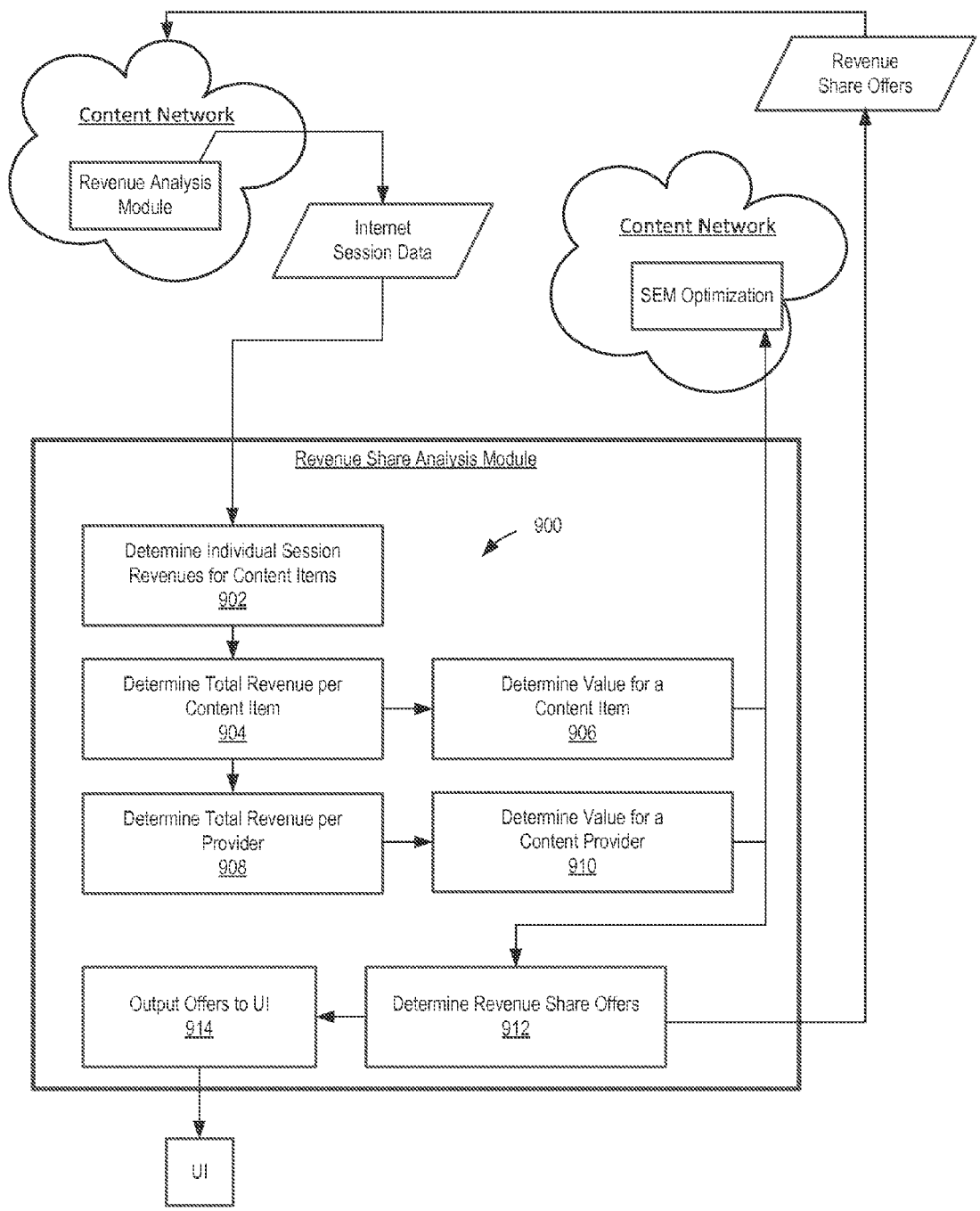
FIG. 9 illustrates example operations performed by an example revenue share analysis module.

FIG. 9 illustrates an example content network, such as content network 300 of FIG. 3, which includes or is communicatively coupled with an example revenue analysis module, an example SEM optimization module, and an example revenue share analysis module that can perform example operations 900. To simplify the description of the operations performed by the revenue share analysis module, the description of FIG. 9 will focus on the processing of web browsing session data (session data), such as session data associated with browsing Internet content on a mobile device. However, it should be understood that any type of data corresponding to audience viewing of and interactions with media can be used by the revenue share analysis module. Media can include any type of media including online and non-online types of media, such as Internet based media, radio, network television, cable television, and print media, for example.

In an example, the revenue share analysis module may be configured to determine individual session revenues for content items provided by content providers, at 902. The individual session revenues may be determined from session data provided by one or more servers of a content network hosting the revenue analysis module (as depicted in FIG. 9). In particular, the revenue analysis module may provide the session data to the revenue share analysis module. The content items may be content items from a content network. The individual session revenues may be revenues generated from respective sessions subsequent to respective presentations of the content items. The session revenues for the content items may be based on respective views of the content items, respective interactions with the content items, and/or respective dwell times of the content items.

The revenue share analysis module may also be configured to determine total session content revenue for each of the content items according to the determined individual session revenues, at 904. For example, for a television show episode distributed via the content network by a provider, a total revenue earned through viewing of that episode can be determined. Also, for example, for an audio file or an electronic book distributed via the content network by a provider, a total revenue generated by downloads or streams of the audio file or the electronic book can be determined. Likewise, for an electronic news article posted on a news website or via a blog post, a total revenue generated by presentation of that article or advertisements presented or clicked with the presentation of that article can be determined.

The revenue share analysis module may also be configured to determine respective content values for each of the content items according to the determined total session revenues for each of the content items, at 906. A content value may be a recommended price for a respective content item, such as a price for a copy or a presentation, such as a view, of the content item.

The revenue share analysis module may also be configured to determine total session provider revenues for each of the content providers according to the determined total session revenues for each of the content items, at 908. For example, a provider may provider hundreds or thousands of content items at any time through the network, and a total revenue generated by that provider's content can be determined accordingly. The determination of revenue at this operation as well as other performed by the revenue share module can be with respect to a determined time period, such as a determination of revenue for the past day, month, or year. The revenue share analysis module may also be configured to determine respective provider values for each of the content providers according to the determined total session revenues for each of the content providers, at 910. The provider values may be a score or ranking of that provider relative to other providers, for example other providers of the same provider class. Provider values may also be a market share percentage or currency value of the content provider. The revenue share analysis module may also be configured to communicate the values determined at operations 906 and 910 to provide input for SEM optimization, such as SEM optimization at 418. Also, SEM optimization may provide input for the determination of revenue share offers at 912 along with the inputs from operations 906 and 910.

The revenue share analysis module may also be configured to determine the revenue share offers to provide to one or more of the content providers according to the content values and/or the provider values, at 912. A revenue share offer to a content provider may be a unique offer to a provider. Such a unique revenue share offer may be according to the determined provider value for a particular provider and/or content values for content provided by that particular provider. The revenue share offers may include revenue share offers per content item, revenue share offers per content subject or genre, revenue share offers per page, revenue share offers per channel, revenue share offers per marketing campaign, offers per content class, offers per provider class, user device classes, user classes, or any combination thereof. A content item may be any item of content distributable to a customer, such as downloadable or streaming text, graphical, audio, and/or video content. Content subjects or genres may include any subject, such as headline news, sports, business, entertainment, local, domestic, or international news stories, fiction, and so forth. Channels may include SEM channels, such as guaranteed and nonguaranteed display content, and broadcast stations, for example. Content classes may include categories by medium of the content, such as electronic or print content, categories by playback device compatibility, by data size of content, and so on. Provider classes may include classes by size of the provider, such as total assets and employees of the provider or amount of content produced by the provider, subject matter associated with the provider, typical medium of content distribution associated with the provider, and so on. User device classes may include classes of devices in general, such as whether the device is capable of playing back digital information or whether the device is mobile, and specific classes, such as classes by compatibility with specific protocols for transmission and playback of electronic content. User classes may include classes by device usage, demographic, psychographic, and so on.

In an example, the revenue share analysis module may also be configured to determine session classes for each of the sessions (not depicted). Session classes may include a web browser session, a content aggregator session, a RSS feed session, or any combination thereof. In such an example, the revenue share analysis module may also be configured to adjust the determined respective content values according to the determined session classes.

Also, the revenue share offers may include a group offer. A group offer may be configured to only be accepted by a plurality of the providers as a group. A grouping of the content providers may be by a degree in which revenue generation of one provider effects revenue generation of another provider. For example, providers whose distributions of content are interdependent of each other may be grouped together. A grouping of the content providers may also be by content classes, provider classes, user classes, and/or user device classes, for example.

The revenue share analysis module may also be configured to output to a user interface, such as for presentation via a graphical user interface on a display device, the determined individual session revenues, the determined total session content revenues, the determined respective content values, the determined total session provider revenues, the determined respective provider values, the determined revenue share offers, or any combination thereof, at 914. Also, the module may communicate the determined individual session revenues, the determined total session content revenues, the determined respective content values, the determined total session provider revenues, the determined respective provider values, the determined revenue share offers, or any combination thereof back to the content network for delivery to content providers of the content network.

With monetization of every session within its content distribution network, a content network provider can determine pricing not only for keywords and other parameters of SEM, but also for agreements with affiliates and partners. Using the per session revenue model for sessions originating from a content partner's content, the content network provider can estimate the value of that partner and their content items. This can translate to ROI and price for every partnership in the network.

Content sharing partnerships can include partnerships between providers that provide their content aggregated on a webpage or through a RSS feed, for example. Other modes of content delivery may include subscription type services owned by the content network provider or a partner. With revenue sharing arrangements, for example, clicks or other types of conversions on content or to such content may equate to various revenue sharing situations, between the partners.

Content aggregators on mobile platforms may provide streams of aggregated content selected by topic and presented in a serial fashion oppose to appearing at different sections of a webpage or through directory structures of a website. Because the presentation to the user is different between an aggregator feed and an aggregator website, engagement with articles via such feeds have different impact on revenue. This can be measured and attributed to revenue sharing agreements as well, via the revenue share analysis module. Even in this format, session data can be used to determine user engagement and associated revenue, and from that determination optimal revenue sharing agreements with partners can be determined as well as optimal keyword selection and pricing.

Besides the format of the content delivery, the device in which a user accesses the content can also provide for differences in engagement with content and revenue generation. Therefore, session data attributed to different user devices, such as smart televisions, tablets, and personal computers, can provide valuable information in determining revenue sharing agreements. For example, where a content provider's content is mostly viewed via a tablet, enhancements associated with the marketing of tablet delivered content may be attributed to a respective revenue sharing agreement in accordance with corresponding session data. Another interesting aspect with respect to mobile platforms is the sessionization of dwell times of content. Dwell time can provide an understanding of how long a user is engaged with a partner's content in a mobile environment, and can provide some insight into the value of that content and the partner.

The invention claimed is:

1. A server system, comprising:
 a network interface configured to communicate with a search engine server;
 a processor configured to communicate with the network interface and implement a keyword recommendation module to:
  select selected keywords and assign the selected keywords to a search engine running on the search engine server for use in a search engine marketing campaign, wherein the search engine marketing campaign identifies a selected publisher of Internet content to relate to the selected keywords;
  control the search engine to increase search result traffic to Internet content of the selected publisher over Internet content of other publishers by instructing, through the network interface, the search engine to promote the Internet content of the selected publisher as a result to search inquiries including the selected keywords run by the search engine;
  receive, through the network interface, Internet session data corresponding to user interactions with the Internet content of the selected publisher presented on online media portals;
  determine, per keyword of the selected keywords, user engagement with the Internet content of the selected publisher resulting from the increased search result traffic based on the Internet session data, wherein the user engagement is measured according to one or more of measured time of a user viewing the Internet content of the selected publisher on the online media portals, measured page views of a user of the Internet content of the selected publisher on the online media portals, and measured dwell times of a user on the online media portals;
  score each keyword of the selected keywords according to the respective determined user engagement with the Internet content of the selected publisher; and
 wherein the processor is further configured to implement an optimization module to:
  optimize the search engine marketing campaign by generating optimized keyword recommendations according to the scoring of the selected keywords and adding the optimized keyword recommendations to the selected keywords.

2. The system of claim 1, wherein the determination of user engagement with the Internet content is according to Internet session data detected from a webpage or mobile application.

3. The system of claim 1, wherein the keyword recommendation module is further configured to:
 categorize keywords by topic into groups and score the groups according to the scoring of the keywords.

4. The system of claim 1, wherein the keyword recommendations include a ranking of the keywords.

5. The system of claim 1, wherein the keyword recommendation module is further configured to:
 further select the keywords by a predetermined categorization of the keywords; and
 associate the keywords with the search engine and the predetermined categorization; and
 wherein the processor is further configured to implement the optimization module to:
  optimize, initially, the search engine marketing campaign according to the scoring of the keywords and the association of the keywords with the search engine and the predetermined categorization.

6. The system of claim 5, wherein the processor is further configured to implement the optimization module to:
 further optimize the search engine marketing campaign according to user engagement after the initial optimization of the search engine marketing campaign.

7. A non-transitory computer readable medium storing instructions that, when executed by a processor, causes the processor to:
 select selected keywords and assign the selected keywords to a search engine running on a search engine server for use in a search engine marketing campaign, wherein the search engine marketing campaign identifies a selected publisher of Internet content to relate to the selected keywords;
 control the search engine to increase search result revenue via traffic to Internet content of the selected publisher over Internet content of other publishers by instructing the search engine to promote the Internet content of the selected publisher as a result to search inquiries including the selected keywords run by the search engine;
 receive, from the search engine server, Internet session data corresponding to user interactions with the Internet content of the selected publisher presented on online media portals;
 determine, per keyword of the selected keywords, revenue generated from the Internet content of the selected publisher according to the increased search result revenue via traffic described by the Internet session data;
 score each keyword of the selected keywords according to the determined revenue generated from the Internet content of the selected publisher; and
 optimize the search engine marketing campaign by generating optimized keyword recommendations according to the scoring of the keywords and adding the optimized keyword recommendations to the selected keywords.

8. The non-transitory computer readable medium of claim 7, wherein the increased search result revenue via traffic described by the Internet session data includes, respectively, one or more of:
 total impressions generated and price per impression, and total clickthroughs and price per click.

9. The non-transitory computer readable medium of claim 7, wherein the instructions when executed by the processor further cause the processor to:
 categorize keywords by topic into groups and score the groups according to the scoring of the keywords.

10. The non-transitory computer readable medium of claim 7, wherein the keyword recommendations include a ranking of the keywords.

11. The non-transitory computer readable medium of claim 7, wherein the instructions when executed by the processor further cause the processor to:
 further select the keywords by a predetermined categorization of the keywords;
 associate the keywords with the search engine and the predetermined categorization; and
 optimize, initially, the search engine marketing campaign according to the scoring of the keywords and the association of the keywords with the search engine and the predetermined categorization.

12. The non-transitory computer readable medium of claim 11, wherein the instructions when executed by the processor further cause the processor to:
 further optimize the search engine marketing campaign according to revenue generated after the initial optimization of the search engine marketing campaign.

13. A method, comprising:
 identifying, by a processor, a search query received by a search engine from a plurality of search queries, the search query including a selected keyword from a search engine marketing campaign that identifies a selected publisher of Internet content to relate to the selected keywords;
 identifying, by the processor, the search engine from a plurality of other search engines operating on a search engine server;
 controlling the search engine to increase search result revenue via traffic to Internet content of the selected publisher over Internet content of other publishers by instructing the search engine to promote the Internet content of the selected publisher as a result to the search query;
 detecting, by the processor, an amount of Internet traffic to a website of the selected publisher controlled by the search engine corresponding to the search query;
 determining, by the processor, a market share of the search engine relative to the plurality of other search engines;
 determining, by the processor, a traffic score for the search query corresponding to the amount of Internet traffic to the website and the market share of the search engine in relation to the plurality of other search engines;
 determining, by the processor, whether the traffic score exceeds expectations; and
 when the traffic score is determined to exceed the expectations, selecting for recommendation, by the processor, the search query from the plurality of search queries.

14. The method of claim 13, further comprising:
 determining a search engine marketing score according to at least part of session data corresponding to use of the website resulting from the search query, wherein the search engine marketing score is a ranking relative to other search queries; and
 optimizing the search engine marketing campaign by using the search engine marketing score.

15. The method of claim 14, wherein optimizing the search engine marketing score includes optimizing a bid for the search query.

16. The method of claim 13, further comprising:
 determining a search engine marketing score according to at least part of session data corresponding to revenue generated by the website resulting from the search query, wherein the search engine marketing score is a ranking relative to other search queries; and
 using the search engine marketing score to optimize the search engine marketing campaign.

17. The method of claim 16, wherein optimizing the search engine marketing score includes optimizing a bid for the search query.

18. The method of claim 13, wherein determining whether the traffic score exceeds expectations includes:
 comparing the traffic score to at least one other traffic score corresponding to at least one other search query of the plurality of search queries, the at least one other search query occurring by at least one other search engine of the plurality of search engines, and the search query and the at least one other search query each including at least one same keyword; and
 comparing search engine market shares for the search engine and the at least one other search engine.

19. The method of claim 13, wherein selecting the search query for recommendation, includes selecting at least one same keyword.

20. The method of claim 13, wherein determining whether the traffic score exceeds expectations, includes:
 determining whether the traffic score is greater than the at least one other traffic score;
 determining whether the market share for the search engine is less than the market share for the at least one other search engine; and
 determining the traffic score exceeds expectations, as a result of the traffic score being greater than the at least one other traffic score and the market share for the search engine being less than the market share for the at least one other search engine.

* * * * *